(12) United States Patent
Chu

(10) Patent No.: US 12,143,783 B1
(45) Date of Patent: Nov. 12, 2024

(54) SOUND SOURCE LOCALIZATION WITH REFLECTION DETECTION

(71) Applicant: Amazon Technologies, Inc., Seattle, WA (US)

(72) Inventor: Wai Chung Chu, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 146 days.

(21) Appl. No.: 17/981,705

(22) Filed: Nov. 7, 2022

(51) Int. Cl.
| | |
|---|---|
| *H04R 3/00* | (2006.01) |
| *G10L 15/08* | (2006.01) |
| *G10L 15/22* | (2006.01) |
| *G10L 25/06* | (2013.01) |
| *G10L 25/21* | (2013.01) |
| *H04R 1/40* | (2006.01) |

(52) U.S. Cl.
CPC .............. *H04R 3/005* (2013.01); *G10L 15/08* (2013.01); *G10L 15/22* (2013.01); *G10L 25/06* (2013.01); *G10L 25/21* (2013.01); *H04R 1/406* (2013.01); *G10L 2015/088* (2013.01)

(58) Field of Classification Search
CPC ......... H04R 3/005; H04R 1/406; G10L 15/08; G10L 15/22; G10L 25/06; G10L 25/21
See application file for complete search history.

(56) References Cited

U.S. PATENT DOCUMENTS

| | | | | |
|---|---|---|---|---|
| 10,798,511 | B1 * | 10/2020 | Sheaffer | H04S 7/305 |
| 11,545,172 | B1 * | 1/2023 | Chu | G10L 25/21 |
| 11,726,161 | B1 * | 8/2023 | Eubank | H04W 4/20 |
| | | | | 367/125 |
| 2015/0156578 | A1 * | 6/2015 | Alexandridis | H04R 3/005 |
| | | | | 381/92 |
| 2016/0367805 | A1 * | 12/2016 | Dietz | A61N 1/36039 |
| 2018/0041849 | A1 * | 2/2018 | Farmani | H04R 25/405 |
| 2018/0133477 | A1 * | 5/2018 | Backus | A61N 1/0541 |
| 2021/0149007 | A1 * | 5/2021 | Kovvali | G10L 21/0264 |
| 2021/0390952 | A1 * | 12/2021 | Masnadi-Shirazi | G10L 15/20 |
| 2022/0052751 | A1 * | 2/2022 | Taghizadeh | H04B 7/043 |

* cited by examiner

*Primary Examiner* — Simon King
(74) *Attorney, Agent, or Firm* — Pierce Atwood LLP

(57) ABSTRACT

A system configured to perform sound source localization (SSL) using reflection detection is provided. A device processes audio data from multiple microphones to determine timing information corresponding to sound sources. For example, the device may determine cross-correlation data for each microphone pair, determine autocorrelation data for each microphone, and then use the autocorrelation data and the cross-correlation data to calculate quality factors. The device may determine the direction of potential sound source(s) by generating Steered Response Power (SRP) data using the cross-correlation data. To perform reflection detection to distinguish between direct sounds and acoustic reflections, the device may generate modified SRP data using the quality factors. For example, the device may process the SRP data to detect two potential sound sources and then process the modified SRP data to determine that a first potential sound source corresponds to direct sound and a second potential sound source corresponds to acoustic reflections.

20 Claims, 13 Drawing Sheets

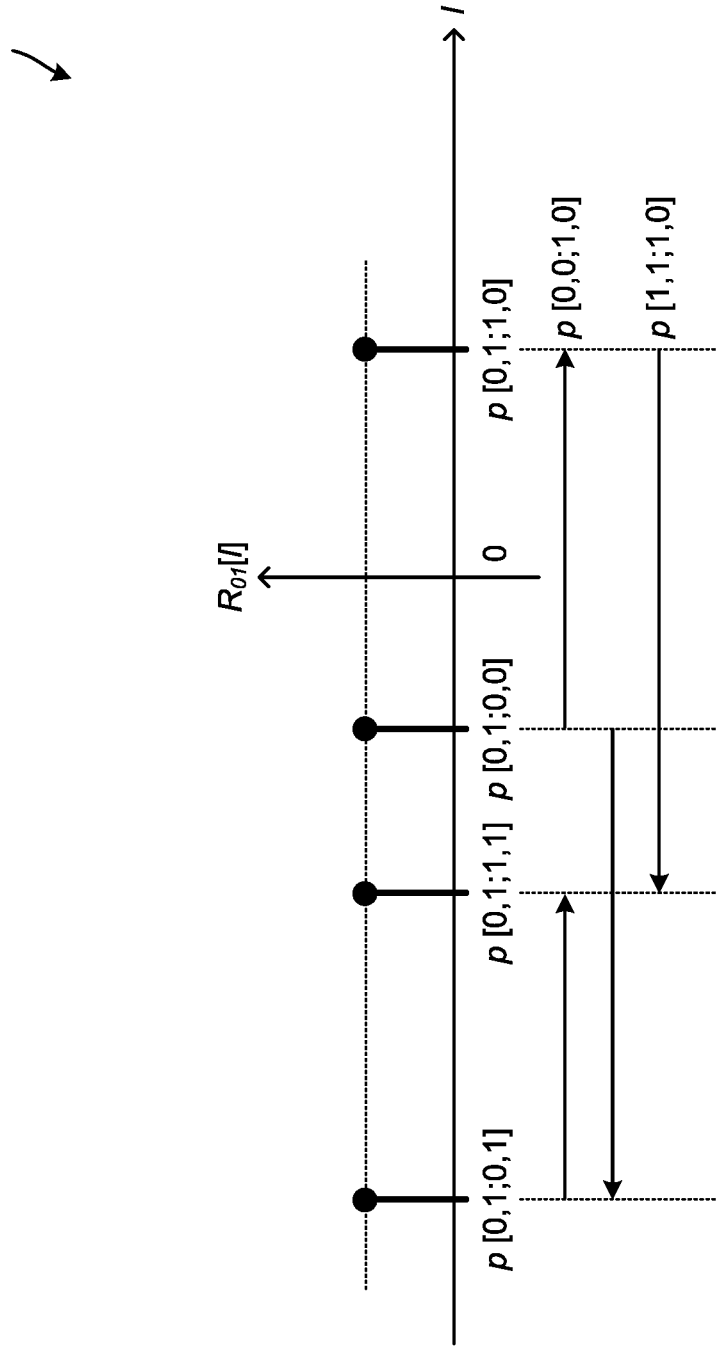

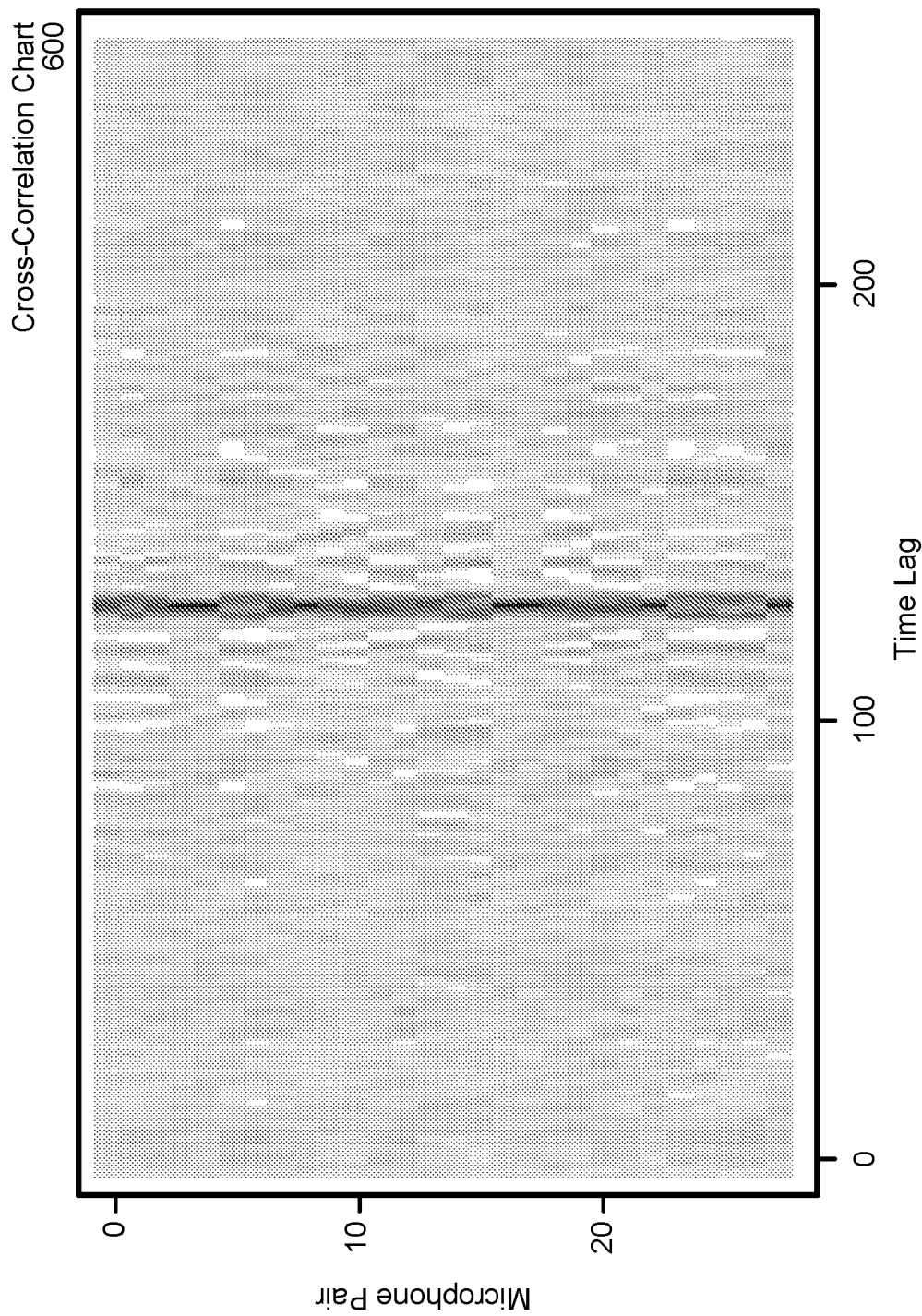

FIG. 8
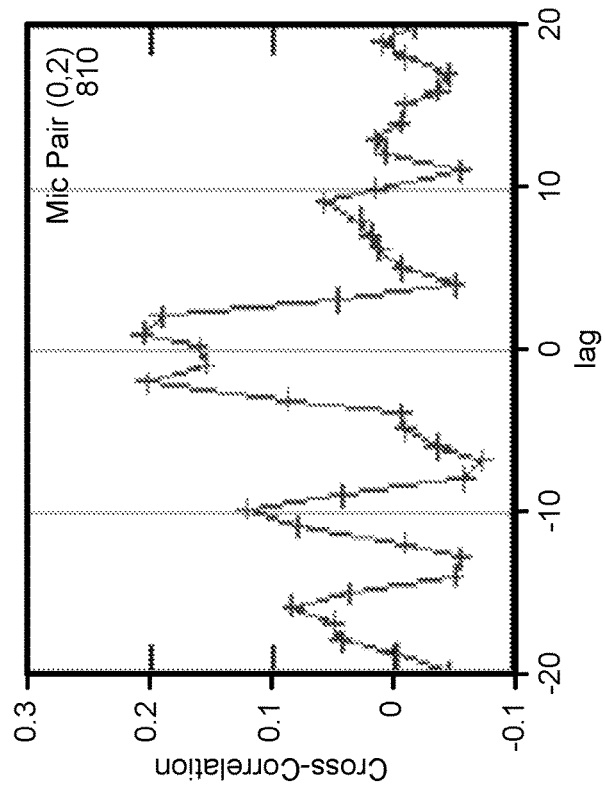
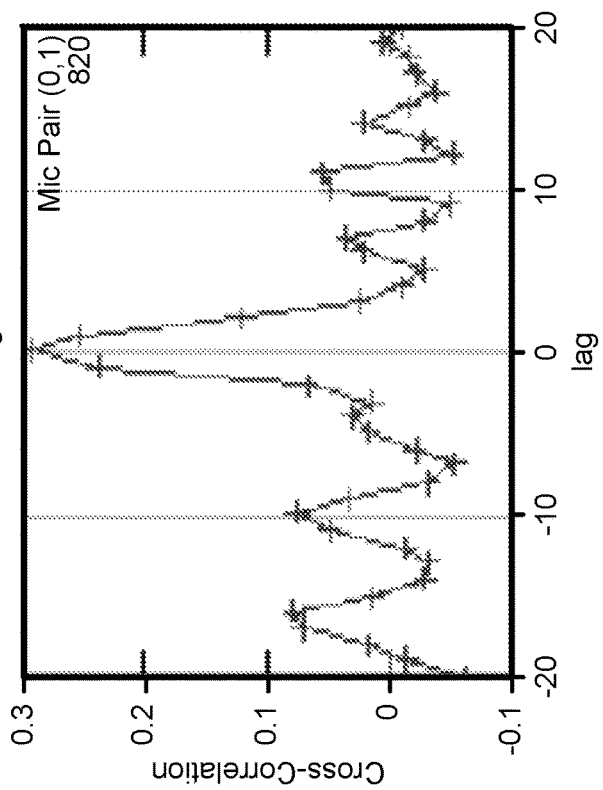
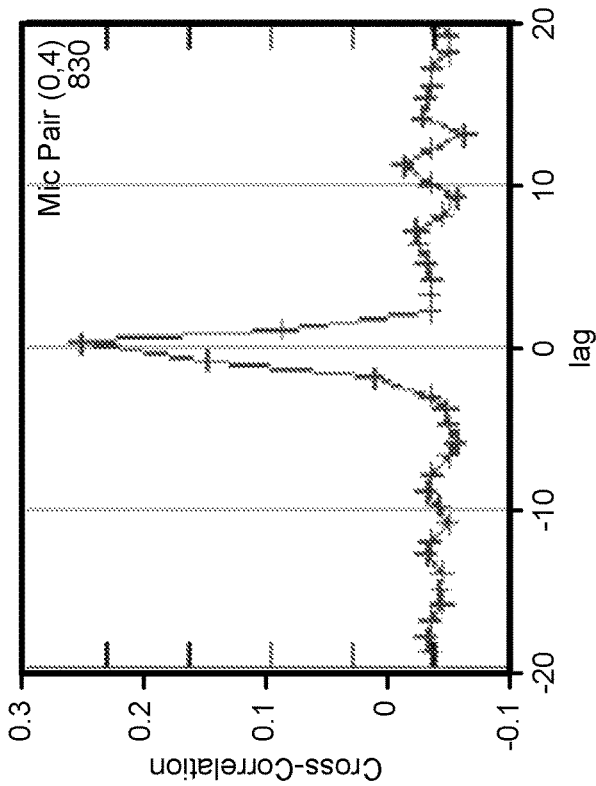

FIG. 9
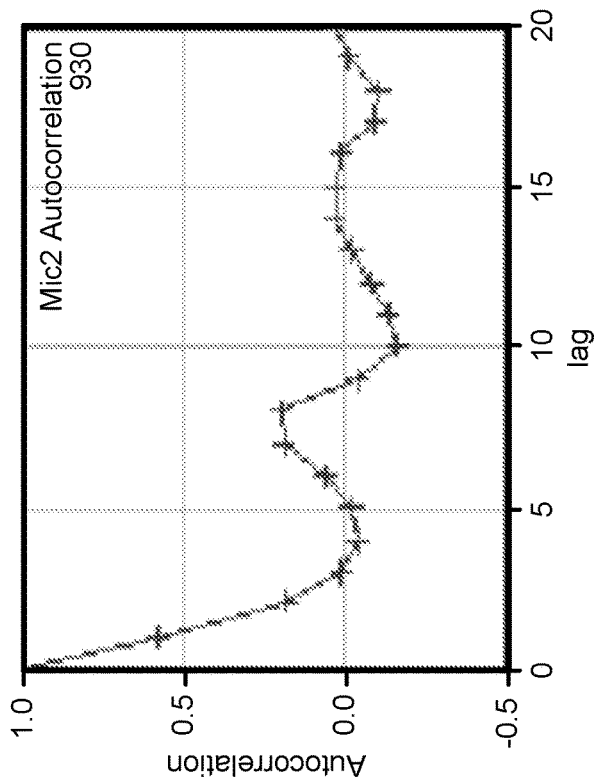
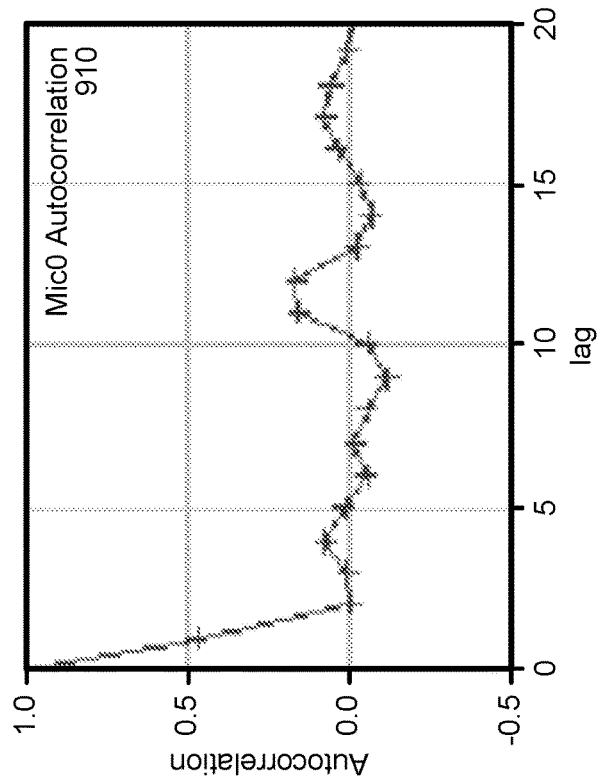
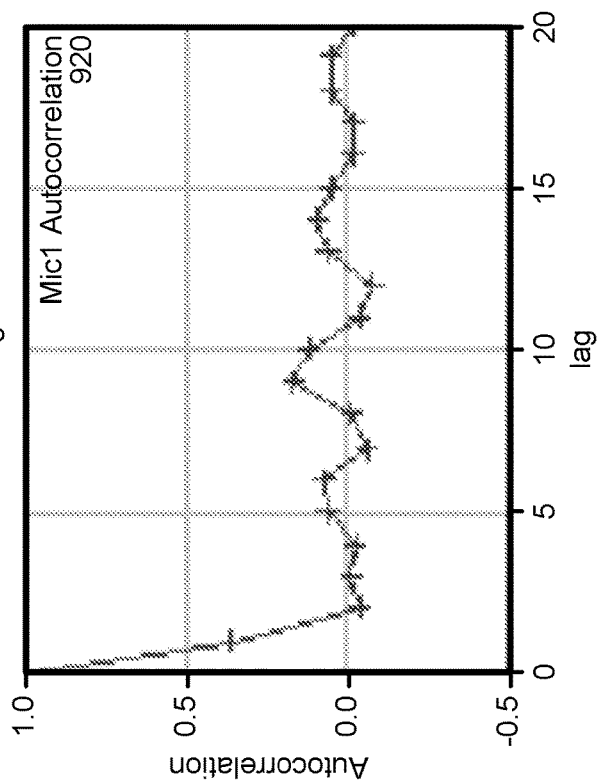

SOUND SOURCE LOCALIZATION WITH REFLECTION DETECTION

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

FIG. 4 illustrates an example of cross-correlation data according to embodiments of the present disclosure.

FIG. 6 illustrates an example of cross-correlation data according to embodiments of the present disclosure.

FIG. 8 illustrates examples of individual cross-correlation sequences according to embodiments of the present disclosure.

FIG. 9 illustrates examples of individual autocorrelation sequences according to embodiments of the present disclosure.

DETAILED DESCRIPTION

Electronic devices may be used to capture audio and process audio data. The audio data may be used for voice commands and/or sent to a remote device as part of a communication session. To respond to a voice command, process a voice command from a particular user, and/or send audio data that only corresponds to the particular user, the device may attempt to isolate desired speech associated with the user from undesired speech associated with other users and/or other sources of noise, such as audio generated by loudspeaker(s) or ambient noise in an environment around the device. For example, the device may perform sound source localization to distinguish between multiple sound sources represented in the audio data. However, while the sound source localization separates the audio data based on the sound source, the device cannot tell which sound source is associated with the desired speech. For example, the sound source localization may not distinguish between a direct sound source and a reflected sound source that corresponds to reflections caused by acoustically reflective surfaces in proximity to the device.

To improve a user experience and an accuracy of sound source localization, devices, systems and methods are disclosed that perform reflection detection to distinguish between direct sound sources and reflections of sound sources. For example, a device may process audio data from multiple microphones to determine timing information corresponding to sound sources near the device. For example, the device may determine cross-correlation data for each microphone pair, determine autocorrelation data for each microphone, and then use the autocorrelation data and the cross-correlation data to calculate quality factors (e.g., modified cross-correlation data). The device may determine the direction of potential sound source(s) by generating Steered Response Power (SRP) data using the cross-correlation data. To perform reflection detection to distinguish between direct sounds and acoustic reflections, the device may generate modified SRP data using the quality factors. For example, the device may process the SRP data to detect two potential sound sources and then process the modified SRP data to determine that a first potential sound source corresponds to a direct sound source in a first direction, while a second potential sound source corresponds to a reflected sound source in a second direction.

Figure 1:
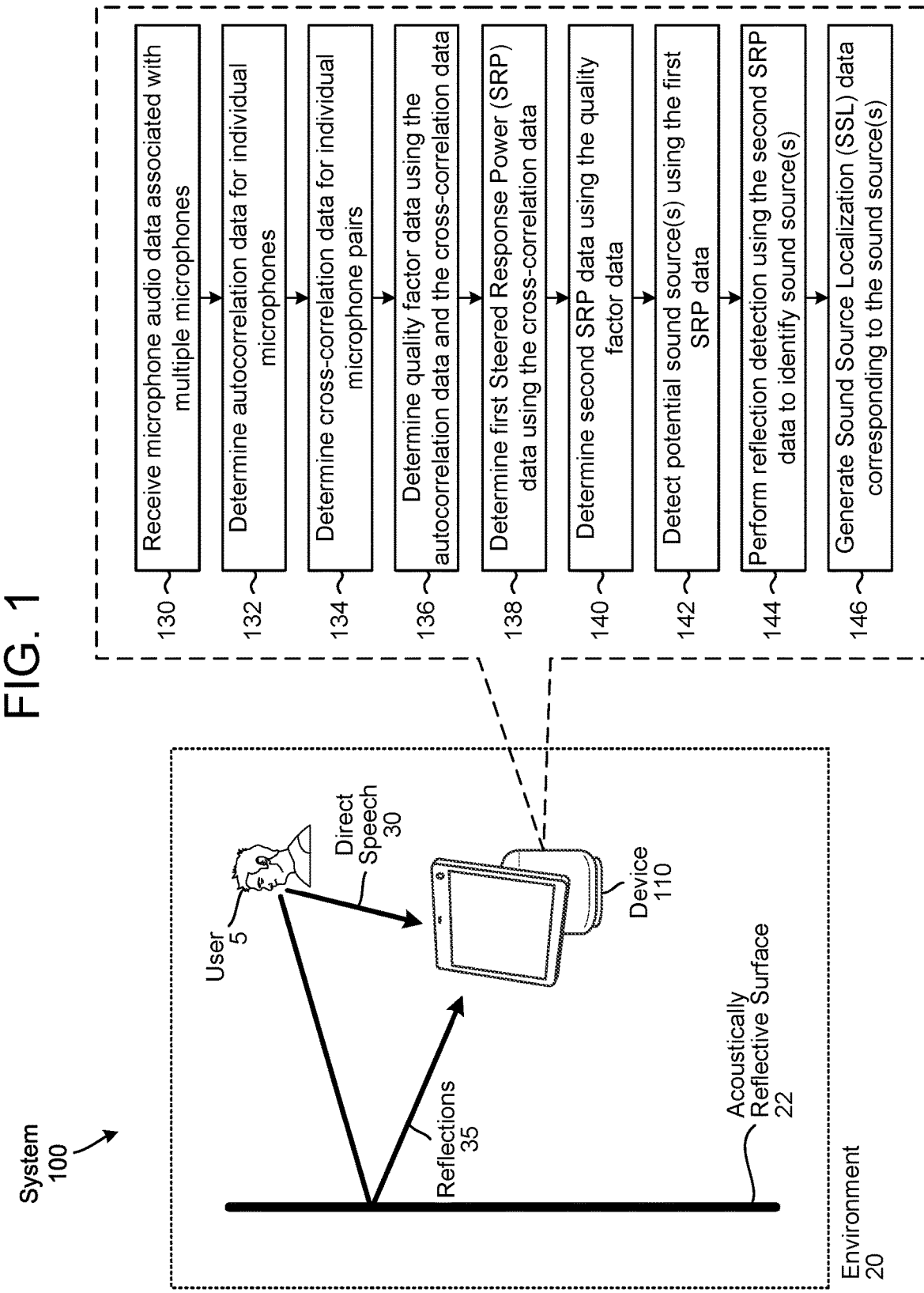
FIG. 1 illustrates a system configured to perform sound source localization with reflection detection according to embodiments of the present disclosure.

FIG. 1 illustrates a high-level conceptual block diagram of a system 100 configured to perform sound source localization with reflection detection according to examples of the present disclosure. Although FIG. 1, and other figures/discussion illustrate the operation of the system in a particular order, the steps described may be performed in a different order (as well as certain steps removed or added) without departing from the intent of the disclosure. As illustrated in FIG. 1, a system 100 may include a device 110 that is configured to capture audio and perform reflection detection as part of processing a voice command received from a user 5.

The device 110 may be an electronic device configured to capture and/or receive audio data. For example, the device 110 may include a microphone array configured to generate microphone audio data that captures audio in a room (e.g., an environment 20) in which the device 110 is located, although the disclosure is not limited thereto and the device 110 may include multiple microphones without departing from the disclosure. As is known and used herein, "capturing" an audio signal and/or generating audio data includes a microphone transducing audio waves (e.g., sound waves) of captured sound to an electrical signal and a codec digitizing the signal to generate the microphone audio data.

As illustrated in FIG. 1, a user 5 may generate a voice command. Some incident sound waves associated with the voice command (e.g., direct speech 30) may propagate through the air in a first direction (e.g., toward the device 110) until being detected by the microphone(s) 112 of the device 110. As used herein, the direct speech 30 may be referred to as direct sound, direct arrival of the audible sound, a line-of-sight component, sound waves associated with a direct path, and/or the like without departing from the disclosure. Other incident sound waves associated with the voice command may propagate through the air in a second direction (e.g., toward the acoustically reflective surface 22) until they reach the acoustically reflective surface 22 (e.g., first wall), at which point first reflected sound waves (e.g., reflections 35) may be reflected by the first wall and propagate through the air until being detected by the microphone(s) 112 of the device 110. While not illustrated in FIG. 1, the incident sound waves may also propagate through the air in a third direction (e.g., toward a second wall) until they reach the second wall, at which point second reflected sound waves may be reflected by the second wall and propagate through the air until being detected the microphone(s) 112. Thus, the device 110 may detect first reflected sound waves associated with the first wall and may detect second reflected sound waves associated with the second wall, although the disclosure is not limited thereto.

When the user 5 generates the voice command at a first time, the microphone(s) 112 may detect strong original sound waves (e.g., incident sound waves) at a second time soon after the first time, which may be referred to as "direct sound." If the device 110 is located in a center of a relatively large room (e.g., relatively large distance between the device 110 and a nearest acoustically reflective surface 22), there may be a lengthy time delay before a third time that the microphone(s) 112 detects reflected sound waves that are reflected by the acoustically reflective surfaces, which may be referred to as "reflections." As a magnitude of a sound wave is proportional to a distance traveled by the sound wave, the reflected sound waves may be relatively weak in comparison to the incident sound waves.

In contrast, if the room is relatively small and/or the device 110 is located near an acoustically reflective surface, there may be a relatively short time delay before the microphone(s) 112 detects the reflected sound waves at the third time and the reflected sound waves may be stronger in comparison to the incident sound waves. If a first acoustically reflective surface is in proximity to the device 110 and a second acoustically reflective surface is distant from the device 110, the device 110 may detect "early reflections" reflected by the first acoustically reflective surface prior to detecting "late reflections" reflected by the second acoustically reflective surface. A time delay of a reflection is proportional to a distance traveled by the reflected sound waves. Thus, early reflections correspond to walls in proximity to the device 110 and late reflections correspond to walls that are distant from the device 110. In some examples, the acoustic reflections caused by surfaces in proximity to the device 110 can get boosted due to constructive interference, such that the acoustic reflection may have a similar or greater magnitude than the direct sound. These reflections are more obvious during music playback and/or when the device 110 is located in a corner, although the disclosure is not limited thereto.

To improve a user experience and correctly interpret voice commands received from the user 5, the device 110 may be configured to perform reflection detection and/or reflection classification to distinguish between the direct sound and the acoustic reflections. For example, the device 110 may detect a first candidate sound source associated with the direct speech 30 and a second candidate sound source associated with the reflections 35. By generating quality factor data and/or modified power values, the device 110 may determine that the second candidate sound source actually corresponds to the acoustic reflections, whereas the first candidate sound source actually corresponds to the direct sound.

As illustrated in FIG. 1, the device 110 may receive (130) microphone audio data from multiple microphones 112. Thus, the first audio data may be referred to as input audio data and may include a representation of the direct speech 30, a representation of the reflections 35, and/or other audible sounds without departing from the disclosure. In some examples, the microphone(s) 112 may be included in a microphone array, such as an array of eight microphones. However, the disclosure is not limited thereto and the device 110 may include any number of microphone(s) 112 without departing from the disclosure. While not illustrated in FIG. 1, in some examples the device 110 may generate output audio using loudspeaker(s) 114 and the output audio may also reflect off of the acoustically reflective surface 22, generating additional reflections captured by the microphone(s) 112. Thus, the first audio data may include a representation of the direct speech 30, a representation of the reflections 35, a representation of the output audio, and/or a representation of reflections of the output audio without departing from the disclosure.

Using the microphone audio data, the device 110 may determine (132) autocorrelation data for individual microphones and may determine (134) cross-correlation data for individual microphone pairs. For example, the device 110 may determine the autocorrelation data as described in greater detail below with regard to FIGS. 2 and 7, and may determine the cross-correlation data as described in greater detail below with regard to FIGS. 3 and 6.

The device 110 may determine (136) quality factor data using the autocorrelation data and the cross-correlation data, as described in greater detail below with regard to FIGS. 5A-5B. For example, the device 110 may use a tolerance function and time shifts determined from the autocorrelation data to process the cross-correlation data and generate the quality factor data.

The device 110 may determine (138) first steered response power (SRP) data using the cross-correlation data and may determine (140) second SRP data using the quality factor data. For example, the device 110 may process correlation values represented in the cross-correlation data to generate the first SRP data (e.g., SRP values), and may then process modified correlation values represented in the quality factor data to generate the second SRP data (e.g., modified SRP values). The SRP values represent power associated with a given direction, and the device 110 may perform further analysis in order to derive the direction(s) of one or more sound sources.

As illustrated in FIG. 1, the device 110 may detect (142) potential sound source(s) using the first SRP data and may perform (144) reflection detection using the second SRP data to identify sound source(s) associated with direct sound. For example, the device 110 may detect potential sound sources by identifying unique peaks represented in the first SRP data, with a location of the peak corresponding to a particular direction. As the quality factor data boosts direct sound and suppresses acoustic reflections, the second SRP data may be used to distinguish whether a potential sound source detected in the first SRP data corresponds to direct sound or an acoustic reflection. For example, the second SRP values may see a boost to the direct sound power and attenuation and/or suppression of the acoustic reflection power relative to the first SRP values.

To illustrate an example, the device 110 may detect two potential sound sources represented in the first SRP data. Using the second SRP data, the device 110 may perform reflection detection to determine which potential sound source corresponds to direct speech 30 (e.g., direct sound waves) received from the sound source (e.g., user 5) and which potential sound source corresponds to acoustic reflections 35 (e.g., reflected sound waves) reflected by the acoustically reflective surface 22. For example, the device 110 may derive a spatial or direction mask based on modified SRP values represented in the second SRP data, optionally perform time smoothing, find a peak value within a frame, and then determine a threshold value by multiplying the peak value with a constant. Using the threshold value, the device 110 may determine a direction associated with the direct sound. For example, the device 110 may determine a single modified SRP value that exceeds the threshold value, although the disclosure is not limited thereto.

After performing reflection detection, the device 110 may generate (146) Sound Source Localization (SSL) data corresponding to the sound source(s). For example, the device 110 may perform SSL processing to distinguish between multiple sound sources represented in the microphone audio data, enabling the device 110 to separate a first portion of the microphone audio data representing the direct speech 30 from a second portion of the microphone audio data representing the output audio and/or other audible sounds.

The device 110 may perform the SSL processing to identify unique sound sources and determine a direction corresponding to each of the sound sources. For example, the device 110 may identify a first sound source in the first direction (e.g., user 5), a second sound source in the second direction (e.g., reflection associated with the acoustically reflective surface 22), a third sound source in a third direction, and/or the like. However, the reflection detection performed in step 144 may determine that the second source corresponds to an acoustic reflection and the device 110 may remove the second sound source from the list of identified sound sources. In some examples, the device 110 may determine the directions associated with each of the identified sound sources and represent these directions as an azimuth value in degrees (e.g., between 0-360 degrees) relative to a position of the device 110, although the disclosure is not limited thereto.

To illustrate an example, the device 110 may determine that the first sound source (e.g., user 5) is associated with a first location (e.g., first direction relative to the device 110) and the SSL data may indicate when an audible sound corresponding to the first location is represented in the microphone audio data. Thus, the SSL data may distinguish between multiple sound sources based on Time of Arrival (TOA) processing, Delay of Arrival (DOA) processing, and/or the like, enabling the device 110 to track the sound sources over time.

In some examples, the device 110 may process a portion of the SSL data to cause an action to be performed. For example, the device 110 may cause speech processing to be performed on the first portion of the microphone audio data, which represents the direct speech 30, in order to determine the voice command uttered by the user 5. The device 110 may then cause an action to be performed that is responsive to the voice command.

An audio signal is a representation of sound and an electronic representation of an audio signal may be referred to as audio data, which may be analog and/or digital without departing from the disclosure. For ease of illustration, the disclosure may refer to either audio data (e.g., reference audio data or playback audio data, microphone audio data or input audio data, etc.) or audio signals (e.g., playback signals, microphone signals, etc.) without departing from the disclosure. Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

In some examples, the audio data may correspond to audio signals in a time-domain. However, the disclosure is not limited thereto and the device 110 may convert these signals to a subband-domain or a frequency-domain prior to performing additional processing, such as adaptive feedback reduction (AFR) processing, acoustic echo cancellation (AEC), noise reduction (NR) processing, and/or the like. For example, the device 110 may convert the time-domain signal to the subband-domain by applying a bandpass filter or other filtering to select a portion of the time-domain signal within a desired frequency range. Additionally or alternatively, the device 110 may convert the time-domain signal to the frequency-domain using a Fast Fourier Transform (FFT) and/or the like.

As used herein, audio signals or audio data (e.g., microphone audio data, or the like) may correspond to a specific range of frequency bands. For example, the audio data may correspond to a human hearing range (e.g., 20 Hz-20 kHz), although the disclosure is not limited thereto.

For ease of explanation, the following descriptions may refer to the device 110 being located in a "room" and detecting walls associated with the room. However, the disclosure is not limited thereto and the device 110 may be located in an "environment" or "location" (e.g., concert hall, theater, outdoor theater, outdoor area, etc.) without departing from the disclosure.

In some examples, the device 110 may include a beamformer that may perform audio beamforming on the microphone audio data to determine target audio data (e.g., audio data on which to perform echo cancellation). The beamformer may include a fixed beamformer (FBF) and/or an adaptive noise canceller (ANC), enabling the beamformer to isolate audio data associated with a particular direction. The FBF may be configured to form a beam in a specific direction so that a target signal is passed and all other signals are attenuated, enabling the beamformer to select a particular direction (e.g., directional portion of the microphone audio data). In contrast, a blocking matrix may be configured to form a null in a specific direction so that the target signal is attenuated and all other signals are passed (e.g., generating non-directional audio data associated with the particular direction). The beamformer may generate fixed beamforms (e.g., outputs of the FBF) or may generate adaptive beamforms (e.g., outputs of the FBF after removing the non-directional audio data output by the blocking matrix) using a Linearly Constrained Minimum Variance (LCMV) beamformer, a Minimum Variance Distortionless Response (MVDR) beamformer or other beamforming techniques. For example, the beamformer may receive audio input, determine six beamforming directions and output six fixed beamform outputs and six adaptive beamform outputs. In some examples, the beamformer may generate six fixed beamform outputs, six LCMV beamform outputs and six MVDR beamform outputs, although the disclosure is not limited thereto. Using the beamformer and techniques discussed below, the device 110 may determine target signals on which to perform acoustic echo cancellation using the AEC. However, the disclosure is not limited thereto and the device 110 may perform AEC without beamforming the microphone audio data without departing from the present disclosure. Additionally or alternatively, the device 110 may perform beamforming using other techniques known to one of skill in the art and the disclosure is not limited to the techniques described above.

As discussed above, the device 110 may include a microphone array having multiple microphones 112 that are laterally spaced from each other so that they can be used by audio beamforming components to produce directional audio signals. The microphones 112 may, in some instances, be dispersed around a perimeter of the device 110 in order to apply beampatterns to audio signals based on sound captured by the microphone(s). For example, the microphones 112 may be positioned at spaced intervals along a perimeter of the device 110, although the present disclosure is not limited thereto. In some examples, the microphone 112 may be spaced on a substantially vertical surface of the device 110 and/or a top surface of the device 110. Each of the microphones 112 is omnidirectional, and beamforming technology may be used to produce directional audio signals based on audio data generated by the microphones 112. In other embodiments, the microphones 112 may have directional audio reception, which may remove the need for subsequent beamforming.

Using the microphone(s) 112, the device 110 may employ beamforming techniques to isolate desired sounds for purposes of converting those sounds into audio signals for speech processing by the system. Beamforming is the process of applying a set of beamformer coefficients to audio signal data to create beampatterns, or effective directions of gain or attenuation. In some implementations, these volumes may be considered to result from constructive and destructive interference between signals from individual microphones 112 in a microphone array.

The device 110 may include a beamformer that may include one or more audio beamformers or beamforming components that are configured to generate an audio signal that is focused in a particular direction (e.g., direction from which user speech has been detected). More specifically, the beamforming components may be responsive to spatially separated microphone elements of the microphone array to produce directional audio signals that emphasize sounds originating from different directions relative to the device 110, and to select and output one of the audio signals that is most likely to contain user speech.

Audio beamforming, also referred to as audio array processing, uses a microphone array having multiple microphones 112 that are spaced from each other at known distances. Sound originating from a source is received by each of the microphones 112. However, because each microphone is potentially at a different distance from the sound source, a propagating sound wave arrives at each of the microphones 112 at slightly different times. This difference in arrival time results in phase differences between audio signals produced by the microphones. The phase differences can be exploited to enhance sounds originating from chosen directions relative to the microphone array.

As described above with regard to FIG. 1, the device 110 may capture an audible noise generated by a sound source by generating audio data that includes both a representation of direct sound (e.g., line-of-sight component, direct arrival of the audible sound, etc.) and representation(s) of one or more reflections of the direct sound. For example, the direct sound corresponds to a line-of-sight component having a direct path between the sound source and the device 110, while the one or more reflections correspond to reflection components that are characterized by a longer path caused by acoustically reflective surfaces reflecting sound waves associated with the audible noise. Thus, the device 110 may capture reflections arriving from multiple directions and may struggle to identify the direct sound associated with the shortest distance.

In the example illustrated in FIG. 1, the device 110 may capture direct speech 30 corresponding to the direct sound along with multiple reflections 35 reflecting from an acoustically reflective surface 22. To illustrate a simple example, the device 110 may capture the direct speech and a single reflection 35, with a corresponding room impulse response having two taps and written as:

$$h[n]=\delta[n-m[0]]+\delta[n-m[1]] \quad [1]$$

where h[n] denotes the room impulse response, m[0] denotes a first time delay associated with the direct speech 30, m[1] denotes a second time delay associated with the reflection 35, and it is assumed that there is no loss in the sound propagation path. In this example, 0<m[0]<m[1] and δ[n] is the delta-dirac function. This may result in two microphones being associated with the following impulse responses:

$$h_0[n]=\delta[n-m[0,0]]+\delta[n-m[0,1]] \quad [2]$$

$$h_1[n]=\delta[n-m[1,0]]+\delta[n-m[1,1]] \quad [3]$$

where the notation m[k, i] represents the time delay of the ith sample of the impulse response associated to the kth sensor (e.g., k=0 or k=1 in this example). Given s being the source signal, the signals found at the microphones are given by:

$$y_0[n]=s[n-m[0,0]]+s[n-m[0,1]] \quad [4]$$

$$y_1[n]=s[n-m[1,0]]+s[n-m[1,1]] \quad [5]$$

Thus, the signals found at the microphones consist of summation of delayed replicas of the source signal. For simplicity, the device 110 may assume that s is white noise, although the disclosure is not limited thereto.

Figure 2:
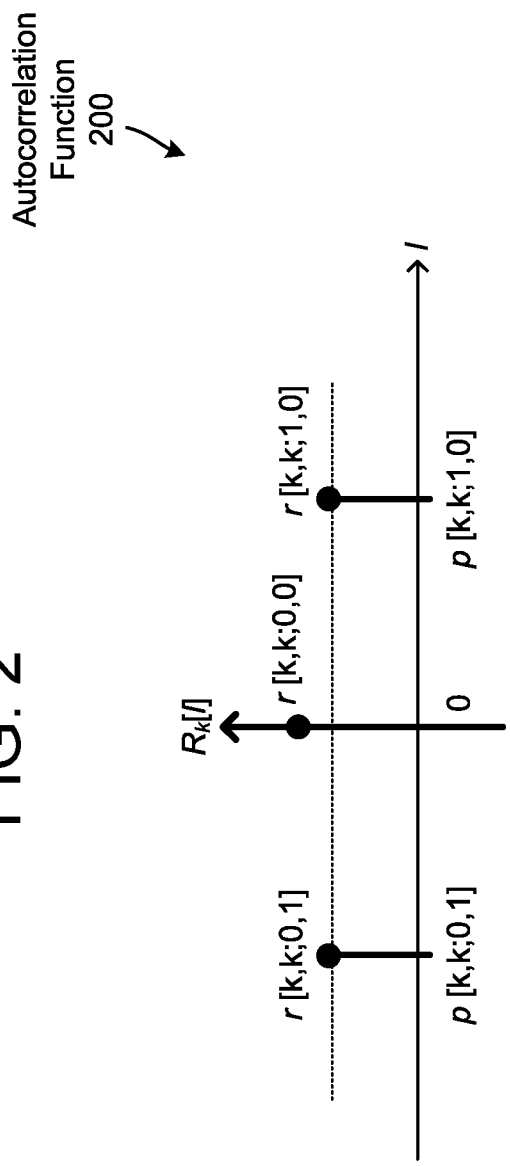
FIG. 2 illustrates an example autocorrelation function according to embodiments of the present disclosure.

FIG. 2 illustrates an example autocorrelation function according to embodiments of the present disclosure. The autocorrelation function for $y_0$ and $y_1$ are calculated as follows:

$$R_0[l] = E\{y_0[n]y_0[n-l]\} = r[0, 0; 0, 0]\delta[l] + \quad [6]$$
$$r[0, 0; 1, 0]\delta[l+p[0, 0; 1, 0]] + r[0, 0; 0, 1]\delta[l+p[0, 0; 0, 1]]$$

$$R_1[l] = E\{y_1[n]y_1[n-l]\} = r[1, 1; 0, 0]\delta[l] + \quad [7]$$
$$r[1, 1; 1, 0]\delta[l+p[1, 1; 1, 0]] + r[1, 1; 0, 1]\delta[l+p[1, 1; 0, 1]]$$

where the notation r[k, k; i, j] denotes the autocorrelation value for the kth sensor with time shift:

$$p[k,k;i,j]=m[k,i]-m[k,j]=-p[k,k;j,i]. \quad [8]$$

where p[k, k; i, j] denotes the time difference between the ith pulse and the jth pulse of the kth impulse response, and its value is negative when i<j since a lower index value implies that the pulse is earlier in time. An example autocorrelation function 200 is illustrated in FIG. 2. In some examples, the device 110 may normalize the autocorrelation data so that R[0]=1.

Figure 3:
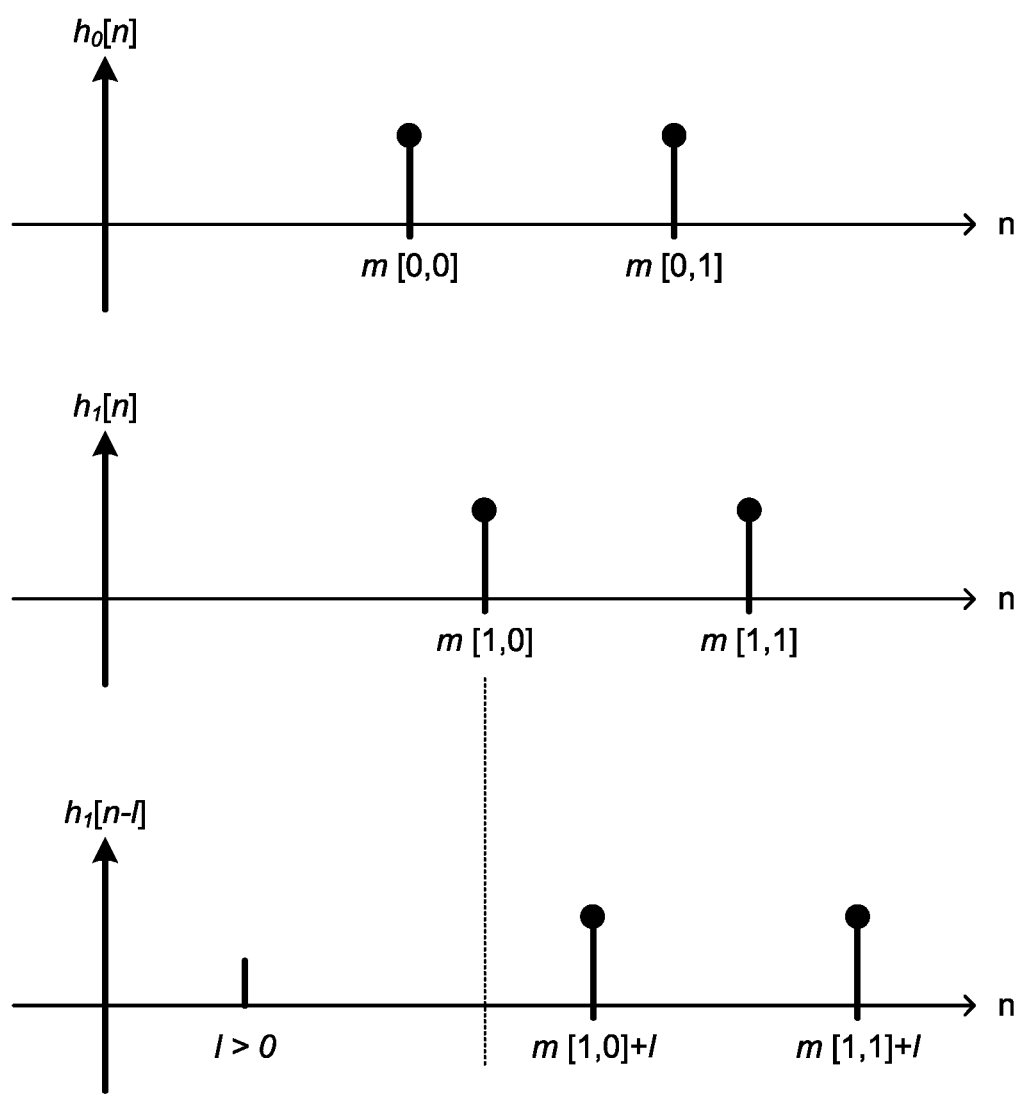
FIG. 3 illustrates an example of relative pulse positions according to embodiments of the present disclosure.

FIG. 3 illustrates an example of relative pulse positions according to embodiments of the present disclosure. As used herein, the device 110 may determine cross-correlation data associated with a pair of microphones using:

$$R_{01}[l]=E\{y_0[n]y_1[n-1]\} \quad [9]$$

where $R_{01}[1]$ denotes the cross-correlation data, $y_0[n]$ denotes first audio data associated with a first microphone (e.g., k=0), and $y_1[n-1]$ denotes second audio data associated with a second microphone (e.g., k=1).

In some examples, the device 110 may determine the cross-correlation data by determining a cross-correlation between the first audio data and the second audio data. For example, the device 110 may determine a cross-correlation between a first plurality of energy values represented in the first audio data and a second plurality of energy values represented in the second audio data during a particular search window (e.g., selected time range or period of time), although the disclosure is not limited thereto. For example, the device 110 may calculate first correlation data that includes a first correlation value (e.g., ranging from 0.0 to 1.0), which indicates a similarity between the first plurality of energy values and the second plurality of energy values.

Similarly, the device 110 may determine second cross-correlation data by determining a cross-correlation between the first audio data and third audio data associated with a third microphone. For example, the device 110 may determine a cross-correlation between the first plurality of energy values represented in the first audio data and a third plurality of energy values represented in the third audio data during the search window. Thus, the device 110 may determine additional cross-correlation data for each microphone pair within the search window. As the device 110 may shift the search window and determine subsequent cross-correlation data, the device 110 may be configured to continuously generate cross-correlation data throughout the duration of an acoustic event.

After determining the cross-correlation data, the device 110 may detect peaks represented in the cross-correlation data. In some examples, the device 110 may eliminate weak peaks represented in the cross-correlation data by performing thresholding. For example, the device 110 may determine a maximum correlation value represented in the cross-correlation data and may determine a threshold value by scaling the maximum value by a constant (e.g., desired percentage). Thus, the device 110 may determine whether a correlation value represented in the cross-correlation data exceeds the threshold value, enabling the device 110 to ignore peaks that are below the threshold value.

FIG. 3 illustrates relative pulse positions 300, which represent the relationships between the impulse responses. As illustrated in FIG. 3, there are up to four possible peaks in the cross-correlation data, which occur at the following time lags:

$$m[1,0]+l=m[0,0], m[1,0]+l=m[0,1], m[1,1]+l=m[0,0], \\ m[1,1]+l=m[0,1] \quad [10]$$

which can be rewritten as:

$$l=m[0,0]-m[1,0]=p[0,1;0,0], \quad [11a]$$

$$l=m[0,1]-m[1,0]=p[0,1;1,0], \quad [11b]$$

$$l=m[0,0]-m[1,1]=p[0,1;0,1], \quad [11c]$$

$$l=m[0,1]-m[1,1]=p[0,1;1,1]. \quad [11d]$$

To phrase this differently, the cross-correlation data will include four possible peaks based on the four pairwise combinations, and the device 110 may determine four different time shifts corresponding to the four possible peaks. As used herein, the time lag corresponds to how far the series are offset (e.g., offset between the first audio data and the second audio data), which can be measured in samples. Thus, a first time lag may correspond to a first number of samples, a second time lag may correspond to a second number of samples, and so on.

The time shifts represented in the cross-correlation data can be defined similarly to the time shifts represented in the autocorrelation data (e.g., Equation [8] above):

$$p[k_0,k_1;i,j]=m[k_0,i]-m[k_1,j], \quad [12a]$$

$$p[k_1,k_0;j,i]=m[k_1,j]-m[k_0,i]=-p[k_0,k_1;i,j]. \quad [12b]$$

where $p[k_0, k_1; i, j]$ denotes the time difference between the ith pulse of the $k_0$ impulse response (e.g., first microphone) and the jth pulse of the $k_1$ impulse response (e.g., second microphone), $m[k_0, i]$ represents the time delay of the ith sample of the $k_0$ impulse response (e.g., first microphone), and $m[k_1, j]$ represents the time delay of the jth sample of the $k_1$ impulse response (e.g., second microphone).

Using Equations [8], [12a], and [12b], a relationship between the time shifts in the cross-correlation data (e.g., $p[k_0, k_1; i, j]$) and the time shifts in the autocorrelation data (e.g., $p[k, k; i, j]$) may be derived as:

$$\begin{aligned} p[k_0, k_0; i, 0] &= m[k_0, i] - m[k_0, 0] \\ &= (m[k_0, i] - m[k_1, j]) - (m[k_0, 0] - m[k_1, j]) \\ &= p[k_0, k_1; i, j] - p[k_0, k_1; 0, j] \\ &= p[k_1, k_0; j, 0] - p[k_1, k_0; j, i]. \end{aligned} \quad [13]$$

Thus, the four locations of the peaks at the cross-correlation sequence $R_{01}[l]$ are found from Equation [12a] to be:

$$p[0,1;0,0]=m[0,0]-m[1,0], \quad [14a]$$

$$p[0,1;1,0]=m[0,1]-m[1,0], \quad [14b]$$

$$p[0,1;0,1]=m[0,0]-m[1,1], \quad [14c]$$

$$p[0,1;1,1]=m[0,1]-m[1,1]. \quad [14c]$$

which corresponds to:

$$m[0,0]<m[0,1], \quad [15a]$$

$$m[1,0]<m[1,1], \quad [15b]$$

and is due to the two pulses and their respective order in the impulse responses. Comparing Equations [15a]-[15b] to [14a]-[14d] results in:

$$p[0,1;0,0]<p[0,1;1,0], \quad [16a]$$

$$p[0,1;0,1]<p[0,1;1,1], \quad [16b]$$

$$p[0,1;0,1]<p[0,1;0,0], \quad [16c]$$

$$p[0,1;1,1]<p[0,1;1,0], \quad [16d]$$

which can be represented as:

$$p[0,1;0,1] < \left\{ \begin{array}{l} p[0,1;0,0] \\ p[0,1;1,1] \end{array} \right\} < p[0,1;1,0] \quad [17]$$

Thus, p[0,1;1,0] is the largest or rightmost, p[0,1;0,1] is the lowest or leftmost, and the order between p[0,1;0,0] and p[0,1;1,1] depends on the impulse responses. In some examples, the cross-correlation data may only include three peaks, such that p[0,1;0,0]=p[0,1;1,1], which implies that:

$$m[0,1]-m[0,0]=m[1,1]-m[1,0] \quad [18]$$

For example, the time-separations of the two pulses in the impulse responses may be the same, or one impulse response may be a shifted version of the other impulse response. Thus, the device 110 may conclude that:

$R_{01}$ contains three or four peaks.
The rightmost peak location is p[0,1;1,0].
The leftmost peak location is p[0,1;0,1].

Given the cross-correlation data $R_{01}[l]$ described above, which may include up to four peaks that correspond to four separate time-shifts, the device 110 may determine which time-shift is associated with direct-path propagation of the audible sound (e.g., line-of-sight component, direct sound, direct arrival of the audible sound, etc.). In some examples, the device 110 may determine the time-shift associated with direct-path propagation by determining the value of p[0,1;0,0]. For example, the device 110 may use the autocorrelation data to determine the values of p[0,0;1,0] and p[1,1;1,0] and may use these time-shift values to determine the direct-path time-shift represented in the cross-correlation data. To illustrate an example, the device 110 may use Equation to determine:

$$p[0,0;1,0]=p[0,1;1,0]-p[0,1;0,0] \quad [19a]$$

$$p[1,1;1,0]=p[1,0;1,0]-p[1,0;0,0] \quad [19b]$$

Applying Equation [12b] to Equation [19b] gives:

$$p[1,1;1,0]=-p[0,1;0,1]+p[0,1;0,0] \quad [20]$$

from which the device 110 may determine:

$$p[0,1;0,0]=p[0,1;1,0]-p[0,0;1,0], \quad [21a]$$

$$p[0,1;0,0]=p[0,1;0,1]+p[1,1;1,0]. \quad [21b]$$

The device 110 may use Equations [21a]-[21b] to verify that a time-shift value found from the cross-correlation data is due to a direct-path (e.g., corresponds to a line-of-sight component). For example, given the time-shifts found from the cross-correlation data in sorted order:

$$p[0,1;0,1]=l_0<l_1<l_2<l_3=p[0,1;1,0] \quad [22]$$

the direct-path time-shift can only be p[0,1;0,0]=$l_1$ or $l_2$. The conditions are:

If $p[0,1;0,0]=l_1$, then $l_0+p[1,1;1,0]=l_1$ and $l_3-p[0,0;1,0]=l_1$ [23a]

If $p[0,1;0,0]=l_2$, then $l_0+p[1,1;1,0]=l_2$ and $l_3-p[0,0;1,0]=l_2$ [23b]

However, the device 110 only needs to verify one condition to determine the final outcome.

In some examples, two impulse responses may be shifted versions of each other, such that p[0,1;0,0]=p[0,1;1,1] and only three peaks exist in the cross-correlation data. For example, the three peaks may correspond to three separate time-shifts (e.g., $l_0<l_1<l_2$), and the middle time shift $l_1$ may correspond to the direct-path (e.g., p[0,1;0,0]=$l_1$).

The peaks' positions in the autocorrelation data lead to:

$$p[0,0;1,0]=p[0,1;1,0]-p[0,1;0,0],k_0=0,k1=1;i=1;j=0; \quad [24a]$$

$$p[0,0;1,0]=p[0,1;1,1]-p[0,1;0,1],k_0=0,k1=1;i=1;j=1; \quad [24b]$$

$$p[1,1;1,0]=p[0,1;0,0]-p[0,1;0,1],k_0=1,k1=0;i=1;j=0; \quad [24c]$$

$$p[1,1;1,0]=p[0,1;1,0]-p[0,1;1,1],k_0=1,k1=0;i=1;j=1. \quad [24d]$$

which relate time position differences for first peaks represented in the cross-correlation data to time positions of second peaks represented in the autocorrelation data. For example, the time position differences of selected peaks represented in the cross-correlation data may be equal to the time position of the second peaks represented in the autocorrelation data, which may be referred to as a raster condition.

As m[k, 1]>m[k,0], then using Equation [8] results in:

$$p[0,0;1,0]>0 \text{ and } p[1,1;1,0]>0 \quad [25]$$

This is due to the fact that the direct path always has the shortest delay, such that the first pulse of the causal impulse response is the closest to the origin.

FIG. 4 illustrates an example of cross-correlation data according to embodiments of the present disclosure. FIG. 4 is a graphical representation of the raster condition, and consists of cross-correlation data 400 (e.g., $R_{01}$) plotted together with arrows drawn underneath according to the following rules:

The length of each arrow is given by the position of the autocorrelation peak, p[0,0;1,0] and p[1,1;1,0].

The arrows associated with p[0,0;1,0] points from left to right, and the arrows associated with p[1,1;1,0] points from right to left.

In general, for $R_{k_0,k_1}[l]$, the arrows associated with p[$k_0$, $k_0$;i,0] points from left to right, and the arrows associated with p[$k_1$,$k_1$;i,0] points from right to left. In addition, when the distance of two cross-correlation peaks in $R_{k_0\ k_1}[l]$ is p[$k_0$,$k_0$;1,0], the cross-correlation peak on the right-side is caused by one more reflection than the left-side peak; and if the distance is p[$k_1$,$k_1$;1,0] the cross-correlation peak on the left-side is caused by one more reflection than the right-side peak.

Based on this raster condition analysis, the direct-path time-shift (e.g., time differential of arrival (TDOA)) p[0,1;0,0] is the position of the peak in $R_{01}$ showing only arrow tails and no arrow heads. This raster matching approach combines the peak positions of both autocorrelation data and cross-correlation data so as to identify the direct-path TDOA p[0,1;0,0].

Given a microphone pair (e.g., Mic 0 and 1), the device 110 may perform raster matching by performing the following procedure:

1. Calculate the autocorrelation sequences $R_0$ and $R_1$ of Mic 0 and 1, respectively. Locate the positions of the peaks p[k,k;i,0], with k=0 or k=1 indicating the microphone index value, and i=1 being the first significant pulse starting from the origin, i=2 being the next significant pulse, and so on (e.g., 0<p[k,k;1,0]<p[k,k;2,0]<p[k,k,3,0]< . . . <p[k,k,I,0]).

2. Calculate the cross-correlation sequence $R_{01}$. Locate positions of the peaks (e.g., $l_0<l_1< \ldots <l_{P-1}$), with P the total number of significant peaks.

3. For each pair of cross-correlation positions $\{I_m<I_n\}$, check to see whether $$l_n-l_m=p[k,k;i,0] \quad [26]$$

for some k (0 or 1) and i>0. If Equation is satisfied, the device 110 has identified a match. In some examples, the device 110 may maintain two arrays with elements that are integers and initialized to zeros. For example, a first array (e.g., directPathHit) and a second array (e.g., echoPathHit) may include enough elements to cover all possible number of peaks in the cross-correlation data.

If the device 110 identifies a match, the device 110 may determine a first number of arrow heads (e.g., echoPathHit) and a second number of arrow tails (e.g., directPathHit). For example, determining the first number and the second number may be equivalent to drawing arrows going from left-to-right or right-to-left and accumulating the arrow heads and the arrow tails.

4. After processing all cross-correlation peaks and under ideal conditions, the direct-path TDOA is the peak position of the cross-correlation sequence associated with the highest directPathHit count and its echoPathHit is zero. Thus, when:

$$n = \underset{i}{\operatorname{argmax}} \, directPathHit[i] \quad [27a]$$

$$echoPathHit[n] = 0 \quad [27b]$$

then $$p[0,1;0,0]=l_n, 0 \leq n < P \quad [27c]$$

This procedure may not produce useful results when subjected to real-world factors, such as sampling and rounding, noise and interference, finite frame length, and/or imperfect pre-whitening of the source signals. For example, these factors may lead to the estimated peak positions represented in the autocorrelation data and the cross-correlation data to be imperfect, preventing raster condition and matching from being performed accurately.

Figure 5A:
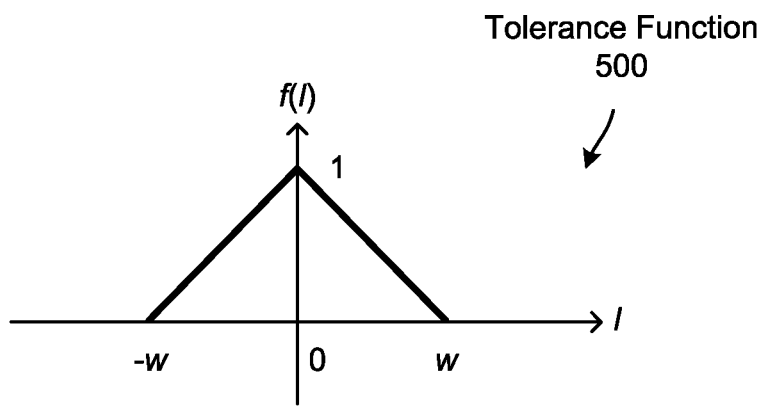
FIGS. 5A-5B illustrate examples of a tolerance function and performing soft raster matching using the tolerance function according to embodiments of the present disclosure.
Figure 5B:
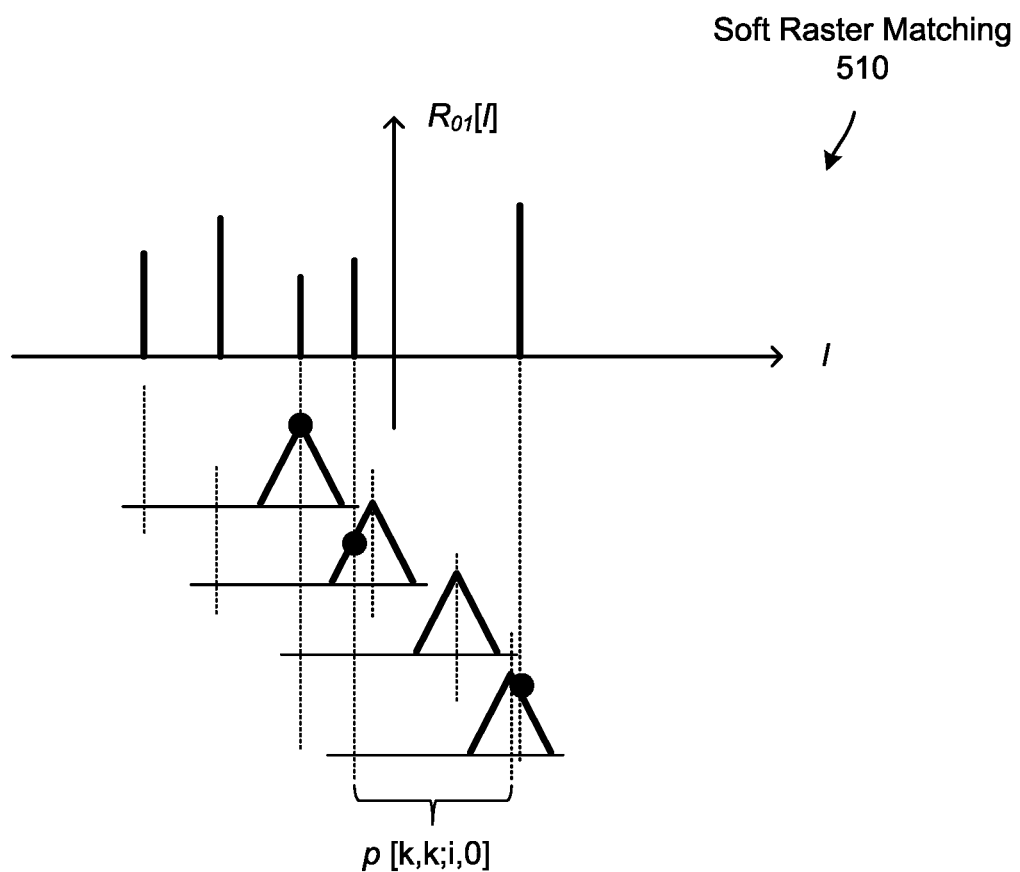

FIGS. 5A-5B illustrate examples of a tolerance function and performing soft raster matching using the tolerance function according to embodiments of the present disclosure. Instead of making hard decisions that are based on perfect matching, the device 110 may deploy soft decisions based on a tolerance function $f(l)$. An example tolerance function 500 is illustrated in FIG. 5A having a peak value of one at the origin and smoothly transitioning to zero as |l| grows and is equal to zero for |l|>w.

As illustrated in FIG. 5A, the width w associated with the tolerance function 500 may vary without departing from the disclosure. Additionally or alternatively, while the tolerance function 500 is illustrated as a triangular shape, the disclosure is not limited thereto. Instead, the tolerance function 500 may correspond to any linear function without departing from the disclosure. For example, the tolerance function 500 may correspond to a number of different linear functions that smoothly transition from a peak value to a value of zero without departing from the disclosure.

FIG. 5B illustrates how the device 110 may use the tolerance function in raster matching. For pairs of cross-correlation peaks, performing an exact match with an autocorrelation peak position is not necessary, and the tolerance function is used to derive a positive or negative contribution to a quality factor for each cross-correlation peak. Given a cross-correlation peak associated with a shifted tolerance function, with the amount of shift given by one of positions of the autocorrelation sequence; then if a significant cross-correlation peak is present within the nonzero domain of the shifted tolerance function, a positive or negative quantity is added to the quality factor associated with said cross-correlation peak. The quality factors derived in this way reflect the amount of direct path hit and echo path hit.

As described above, time position differences of selected peaks represented in the cross-correlation data may be equal to a time position of peaks represented in the autocorrelation data, which may be referred to as a raster condition. These autocorrelation peak positions may be denoted by $p[k,k;i,0]$ for $i=1$ to $P_k$, where k denotes the microphone index value and i denotes an individual peak represented in the autocorrelation data.

An example of applying the tolerance function 500 based on a single autocorrelation peak (e.g., time shift) is illustrated in FIG. 5B as soft raster matching 510. As illustrated in FIG. 5B, the device 110 may determine cross-correlation data $R_{01}$ associated with a microphone pair (e.g., first microphone index $k_0$ and second microphone index $k_1$), which may include five significant peaks. To perform the soft raster matching 510, the device 110 may apply shifted tolerance functions to the five significant peaks, with an offset of the shifted tolerance functions given by a position of one of the autocorrelation peaks $p[k,k;i,0]$. For example, the device 110 may select a first autocorrelation peak from the plurality of autocorrelation peaks, determine a time position $p[k,k;i,0]$ associated with the first autocorrelation peak, determine shifted tolerance functions based on the time position $p[k,k;i,0]$, and apply the shifted tolerance functions to the five significant peaks.

To illustrate a first example, the device 110 may determine a first shifted tolerance function for a first significant peak represented in the cross-correlation data by offsetting the tolerance function 500 from the first significant peak based on the time position $p[k,k;i,0]$. As illustrated in FIG. 5B, if the device 110 determines that a third significant peak represented in the cross-correlation data is present within the nonzero domain of the first shifted tolerance function, the device 110 may add a positive or negative quantity to a third quality factor associated with the third significant peak.

To illustrate a second example, the device 110 may determine a second shifted tolerance function for a second significant peak represented in the cross-correlation data by offsetting the tolerance function 500 from the second significant peak based on the time position $p[k,k;i,0]$. As illustrated in FIG. 5B, if the device 110 determines that a fourth significant peak represented in the cross-correlation data is present within the nonzero domain of the second shifted tolerance function, the device 110 may add a positive or negative quantity to a fourth quality factor associated with the fourth significant peak. In the example illustrated in FIG. 5B, a first positive quantity added to the third quality factor is greater than a second positive quantity added to the fourth quality factor, as a first magnitude of the first shifted tolerance function at the third significant peak is higher than a second magnitude of the second shifted tolerance function at the fourth significant peak.

To illustrate a third example, the device 110 may determine a third shifted tolerance function for a third significant peak represented in the cross-correlation data by offsetting the tolerance function 500 from the third significant peak based on the time position $p[k,k;i,0]$. As illustrated in FIG. 5B, if the device 110 determines that none of the significant peaks are present within the nonzero domain of the third shifted tolerance function, the device 110 does not modify any of the quality factors.

To illustrate a fourth example, the device 110 may determine a fourth shifted tolerance function for a fourth significant peak represented in the cross-correlation data by offsetting the tolerance function 500 from the fourth significant peak based on the time position $p[k,k;i,0]$. As illustrated in FIG. 5B, if the device 110 determines that a fifth significant peak represented in the cross-correlation data is present within the nonzero domain of the fourth shifted tolerance function, the device 110 may add a positive or negative quantity to a fifth quality factor associated with the fifth significant peak.

While not illustrated in FIG. 5B, the device 110 may perform the steps described above to determine a fifth shifted tolerance function for the fifth significant peak without departing from the disclosure. However, the disclosure is not limited thereto; as the fifth significant peak is the right-most significant peak represented in the cross-correlation data and the time position p[k,k;i,0] goes left-to-right, the device 110 may determine that none of the significant peaks will be offset from the fifth significant peak using the time position p[k,k;i,0].

The inputs to the algorithm may include:

Autocorrelation sequence $R_0[l]$ and $R_1[l]$, for $l \geq 0$. The device 110 may assume that the sequences are normalized so that $R[0]=1$.

The autocorrelation peaks are located according to:

$$R[l-1] < R[l] > R[l+1], R[l] \geq R \text{ min}, l \geq La \quad [28]$$

with R min>0 a threshold for the autocorrelation values, and La a minimum lag bound that is found according to the shortest reflective distance. For example, if the shortest distance from any microphone to the wall is d, then $$La = [2 \cdot d \cdot fs/c] \quad [29]$$

with d the distance in meters, c the speed of sound (m/s), and fs the sampling frequency (Hz). The autocorrelation peak positions are denoted by p[0,0; i,0], i=1 to P0 and p[1,1;i,0] for i=1 to P1.

Cross-correlation sequence $R_{01}[l]$.

Cross-correlation peak positions $l_n$, n=0 to Pc−1. The peaks are located based on an adaptive threshold calculated as α·R max, with R max the largest correlation value and α a positive constant; correlation values below the threshold are not taken into account.

A lag bound L which is the largest time lag (e.g., time lag value) between the microphones and is proportional to their maximum distance. The cross-correlation peaks need to be located for the entire range but only those with absolute lags that are less than or equal to L need to have the quality factors found. This is because the powers of the SRP algorithm are computed exclusively using the cross-correlation values inside lag E [−L, L].

The outputs of the algorithm are the quality factors $q_n$, n=0 to Pc−1 associated with the cross-correlation peak at $I_n$. For $|I_n|>L$, $q_n$ is set to zero. The number of cross-correlation peaks satisfying $|l| \leq L$ is denoted by numPeaks.

In some examples, the device 110 may determine whether a cross-correlation peak is found inside an interval of width 2w centered at a given lag. Provided that the number of peaks is greater than one (e.g., numPeaks >1), the device 110 may then implement soft raster matching and calculate the quality factors (e.g., quality factor data).

Based on the quality factors $q_n$, n=0 to Pc−1, a cross-correlation peak position $I_n$ may be a candidate direct-path TDOA if $q_n > \theta$, where θ is an adaptive threshold given by:

$$\theta = \min_{n = 0 \ldots Pc - 1} R_{01}[l_n] \quad [30]$$

The previous equations enable the device 110 to perform a first stage of elimination to remove unlikely direct-path candidates. However, additional processing may be needed to determine the final direct-path TDOA associated with the sound source. In some examples, the device 110 may use the quality factor data to perform this additional processing. For example, the device 110 may use the quality factor data as features to perform reflection detection, reflection classification, and/or the like, although the disclosure is not limited thereto.

As described above, the number of cross-correlation peaks satisfying $|l| \leq L$ is denoted by numPeaks. If there is only a single peak in the cross-correlation data (e.g., numPeaks=1), there is no need to calculate any quality factor because in that case the device 110 cannot distinguish direct-path from echo-path. This situation may occur when both microphones are parallel to an acoustically reflective surface (e.g., wall), resulting in the TDOA being zero for both direct sound and its wall reflection, and the cross-correlation has a peak at zero lag, although the disclosure is not limited thereto.

In some situations, two peaks in the cross-correlation data may be so close together that they appear to be a single peak. In some examples, two microphones positioned near the wall may produce small TDOA values due to a direction of the sound source. For example, the direct sound (e.g., line-of-sight component, direct arrival of the audible sound, etc.) may reach a first microphone and then a second microphone, while an acoustic reflection may reach the second microphone and then the first microphone, resulting in a TDOA of the same magnitude but opposite in sign. Depending on the angle-of-arrival, the TDOAs may have small magnitudes, hence the positions of the cross-correlation peaks may be close to the origin. If the positions are close enough, the two peaks may merge into a single peak. However, the disclosure is not limited thereto, and this scenario may also occur when two microphones are located in close proximity to one another, although the disclosure is not limited thereto.

In some examples, the device 110 may only determine the quality factors if there is more than one peak represented in the cross-correlation data (e.g., numPeaks >1). However, the disclosure is not limited thereto, and the device 110 may determine the quality factors for each time lag in [−L, L], with the resultant factors used to determine the time lags (e.g., time lag values) related to the direct-path and the echo-path. Additionally or alternatively, the device 110 may use the quality factors to calculate a set of modified power values, such as modified Steered Response Power (SRP) values, with the reflection(s) suppressed. For example, the device 110 may determine the modified SRP values using the quality factors because the quality factors are derived from the cross-correlation values that are typically used to calculate the SRP values as a function of direction.

To illustrate an example, a microphone array was placed a first distance (e.g., 10 cm) from a wall that is parallel to a vertical axis of the microphone array (e.g., wall intersects a horizontal axis at x=−0.1), while a sound source was placed a second distance (e.g., 1 m) from the microphone array in a first direction (e.g., azimuth of 0°, which corresponds to x=1 or [1, 0]). FIG. 6 illustrates a single frame of cross-correlation data generated using the microphone array, while FIG. 7 illustrates a single frame of autocorrelation data.

FIG. 6 illustrates an example of cross-correlation data according to embodiments of the present disclosure. The device 110 may use a frequency domain technique to calculate the cross-correlation data, such as a Fast Fourier Transform (FFT), although the disclosure is not limited thereto. In some examples, the device 110 may use a first sampling rate (e.g., 16 kHz), such that each frame has a first duration (e.g., 8 ms) and a first number of samples (e.g., 128). If the device 110 uses an FFT with a first length (e.g., 256), the device 110 may calculate the correlation sequences by concatenating two audio frames (e.g., 256 samples), although the disclosure is not limited thereto.

An example cross-correlation chart 600 is illustrated in FIG. 6. As the microphone array includes eight microphones, the cross-correlation chart 600 may include twenty-eight cross-correlation sequences (e.g., one sequence per microphone pair). Thus, a vertical axis of the cross-correlation chart 600 corresponds to an index indicating a respective microphone pair from 0 to 27, while a horizontal axis corresponds to a time lag (e.g., time lag value). A magnitude of the cross-correlation data is represented by an amount of shading, ranging from low (e.g., white) to high (e.g., black).

Figure 7:
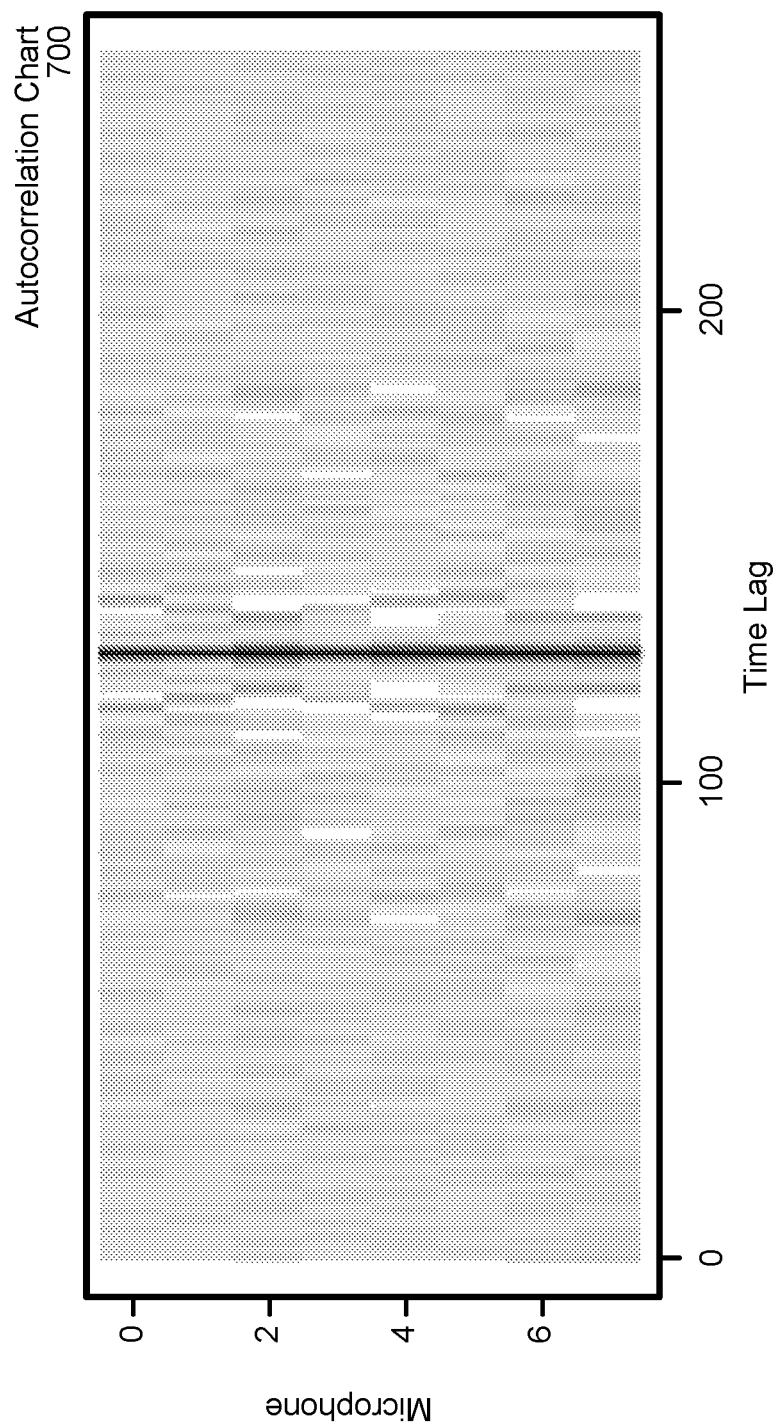
FIG. 7 illustrates an example of autocorrelation data according to embodiments of the present disclosure.

FIG. 7 illustrates an example of autocorrelation data according to embodiments of the present disclosure. An example autocorrelation chart 700 is illustrated in FIG. 7. As the microphone array includes eight microphones, the autocorrelation chart 700 may include eight autocorrelation sequences (e.g., one sequence per microphone). Thus, a vertical axis of the autocorrelation chart 700 corresponds to an index indicating a respective microphone from 0 to 7, while a horizontal axis corresponds to a time lag (e.g., time lag value). A magnitude of the cross-correlation data is represented by an amount of shading, ranging from low (e.g., white) to high (e.g., black).

FIG. 8 illustrates examples of individual cross-correlation sequences according to embodiments of the present disclosure. For example, FIG. 8 illustrates first cross-correlation data (e.g., a first cross-correlation sequence) associated with a first microphone pair 810 (e.g., $k_0$ and $k_2$), second cross-correlation data (e.g., a second cross-correlation sequence) associated with a second microphone pair 820 (e.g., $k_0$ and $k_1$), and third cross-correlation data (e.g., a third cross-correlation sequence) associated with a third microphone pair 830 (e.g., $k_0$ and $k_4$).

The first microphone pair 810 corresponds to a first microphone (e.g., $k_0$) positioned along a horizontal axis of the microphone array in a first direction (e.g., first coordinates [1, 0]) and a third microphone (e.g., $k_2$) positioned along the horizontal axis in a second direction opposite the first direction (e.g., second coordinates [−1, 0]). In contrast, the second microphone pair 820 corresponds to the first microphone (e.g., $k_0$) and a second microphone (e.g., $k_1$) positioned along the vertical axis in a third direction (e.g., third coordinates [0, 1]), such that the second microphone $k_1$ is offset from the first microphone $k_0$ in both horizontal and vertical directions. Finally, the third microphone pair 830 corresponds to the first microphone (e.g., $k_0$) and a fifth microphone (e.g., $k_4$) that is offset from the first microphone $k_0$ in a fourth direction opposite the third direction (e.g., fourth coordinates [1, −1]). Thus, the first microphone pair 810 corresponds to a horizontal offset, the third microphone pair 830 corresponds to a vertical offset, and the second microphone pair 820 corresponds to both a horizontal offset and a vertical offset.

As illustrated in FIG. 8, first cross-correlation data corresponding to the first microphone pair 810 includes two distinct peaks within the interval lag∈[−L, L]. This is due to the first microphone pair 810 being a first distance apart (e.g., 4 cm) along the transmission path (e.g., straight line parallel to the horizontal axis), such that the direct sound reaches the third microphone (e.g., $k_2$) and the first microphone (e.g., $k_0$) at two different times. However, as the second microphone pair 820 is closer together, only a single peak is represented in second cross-correlation data corresponding to the second microphone pair 820. Finally, as the third microphone pair 830 are an equal horizontal distance from the wall, only a single narrow peak is represented in third cross-correlation data corresponding to the third microphone pair 830. As illustrated in FIG. 8, the peak represented in the second cross-correlation data is noticeably wider than the narrow peak represented in the third cross-correlation data. This is due to the second microphone pair 820 being horizontally offset by a second distance (e.g., 2 cm), whereas the third microphone pair 830 are not offset in the horizontal direction.

Of the cross-correlation data illustrated in FIG. 8, the first cross-correlation data is the most useful for performing reflection detection, as the device 110 may distinguish between the two peaks in the first cross-correlation data. For example, the device 110 may determine that a first peak corresponds to the direct sound and a second peak corresponds to an acoustic reflection. This is due to the distance separating the first microphone pair 810 along the transmission path, as increasing this separation distance results in greater separation between the peaks represented in the cross-correlation data. In contrast, the third cross-correlation data is least useful for performing reflection detection, as the sharp peak means that the time delays for the signal components are almost zero. Meanwhile, in some examples the second cross-correlation data may be useful for reflection detection despite not having separated peaks.

The cross-correlation data illustrated in FIG. 8 only corresponds to a first direction-of-arrival. As a direction-of-arrival varies based on a location of the sound source and/or the wall relative to the microphone array, in some examples the second microphone pair 820 and/or the third microphone pair 830 may be more useful for performing reflection detection. For example, as the distance separating each microphone pair along the transmission path varies based on the direction-of-arrival, the second microphone pair 820 may be used for a second direction-of-arrival and the third microphone pair 830 may be used for a third direction-of-arrival without departing from the disclosure.

FIG. 9 illustrates examples of individual autocorrelation sequences according to embodiments of the present disclosure. As illustrated in FIG. 9, the device 110 may determine first autocorrelation data 910 (e.g., a first autocorrelation sequence) associated with a first microphone (e.g., $k_0$), which is labeled as Mic0 autocorrelation data 910, second autocorrelation data 920 (e.g., a second autocorrelation sequence) associated with a second microphone (e.g., $k_1$), which is illustrated as Mic1 autocorrelation data 920, and third autocorrelation data 930 (e.g., a third autocorrelation sequence) associated with a third microphone (e.g., $k_2$), which is illustrated as Mic2 autocorrelation data 930.

As described above, the first microphone (e.g., $k_0$) is furthest from the wall, followed by the second microphone (e.g., $k_1$), while the third microphone (e.g., $k_2$) is closest to the wall. The positions of the earliest major peaks represented in the autocorrelation data illustrated in FIG. 9 reflects the relative positions of the microphones. For example, a first earliest major peak represented in Mic0 autocorrelation data 910 occurs later than a second earliest major peak represented in Mic1 autocorrelation data 920, while the second earliest peak occurs later than a third earliest major peak represented in Mic2 autocorrelation data 930.

Figure 10:
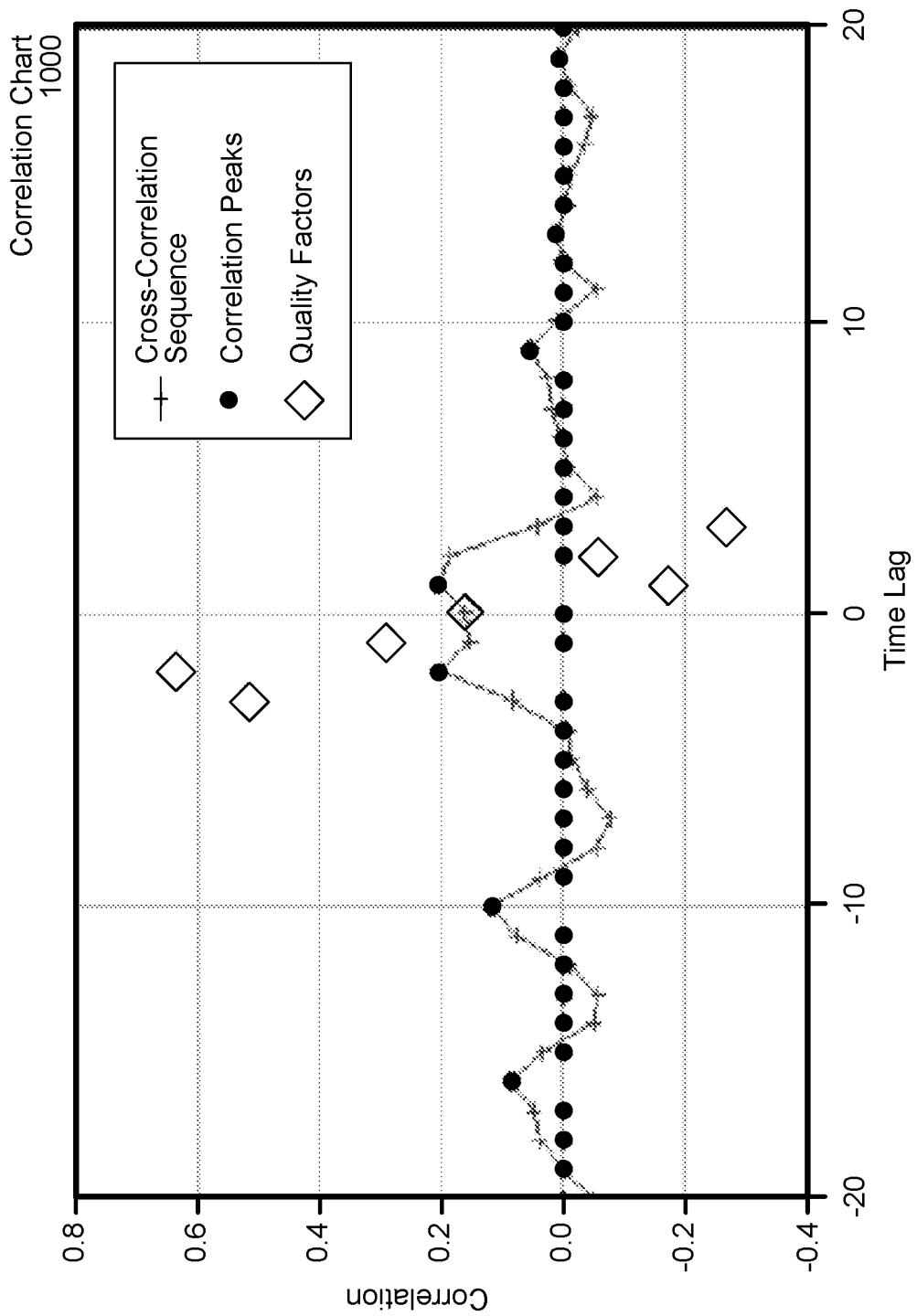
FIG. 10 illustrates an example of cross-correlation data and modified cross-correlation data according to embodiments of the present disclosure.
Figure 11:
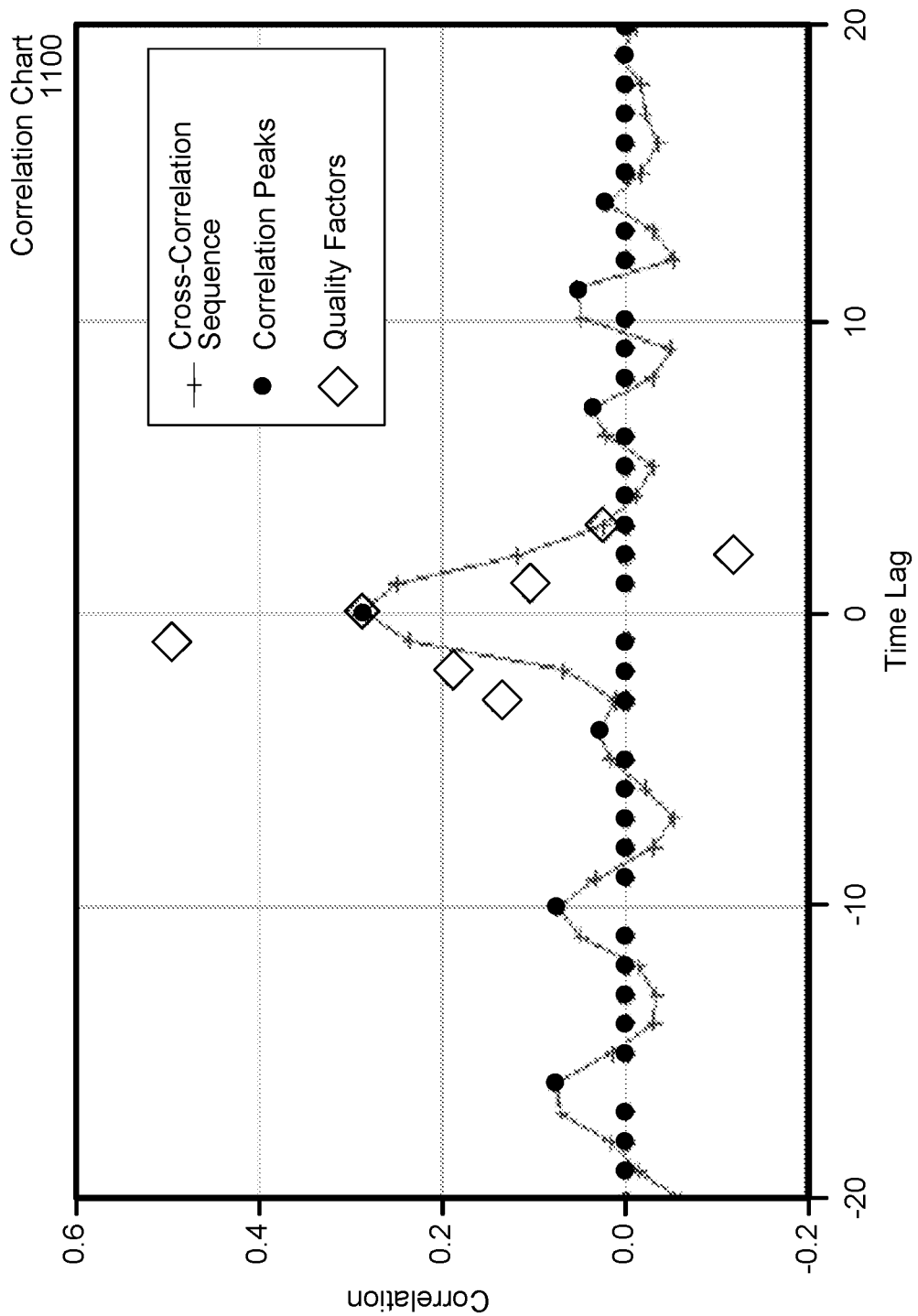
FIG. 11 illustrates an example of cross-correlation data and modified cross-correlation data according to embodiments of the present disclosure.
Figure 12:
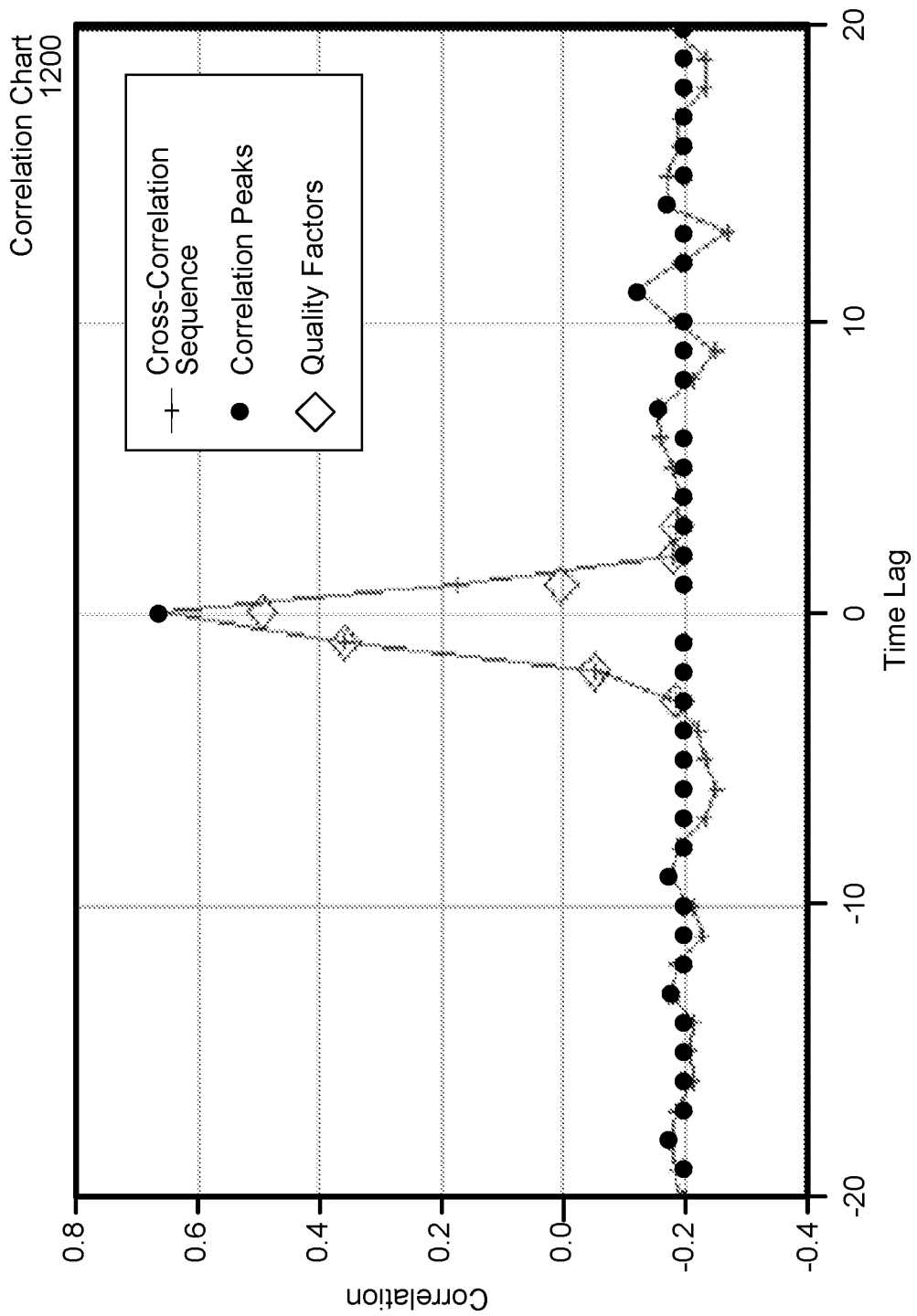
FIG. 12 illustrates an example of cross-correlation data and modified cross-correlation data according to embodiments of the present disclosure.

Examples of quality factor data are illustrated in FIGS. 10-12, which correspond to the cross-correlation data illustrated in FIG. 8. For example, FIG. 10 illustrates a correlation chart 1000 corresponding to the first microphone pair 810 (e.g., $k_0$ and $k_2$), FIG. 11 illustrates a correlation chart 1100 corresponding to the second microphone pair 820 (e.g., $k_0$ and $k_1$), and FIG. 12 illustrates a correlation chart 1200 corresponding to the third microphone pair 830 (e.g., $k_0$ and $k_4$).

FIG. 10 illustrates an example of cross-correlation data and modified cross-correlation data according to embodiments of the present disclosure. As illustrated in FIG. 10, correlation chart 1000 represents first cross-correlation data for the first microphone pair 810 (e.g., $k_0$ and $k_2$) as a line, first correlation peak values corresponding to the first cross-correlation data as circles, and first quality factor values as diamonds.

In some examples, the device 110 may use the first cross-correlation data to determine SRP values. Similarly, the device 110 may use the first quality factor values to determine modified SRP values without departing from the disclosure. For example, the modified SRP values may see a boost to the direct sound power and attenuation and/or suppression of the acoustic reflection power relative to the SRP values.

The first cross-correlation data included in the correlation chart 1000 corresponds to the cross-correlation data for the first microphone pair 810 illustrated in FIG. 8 and previously described above. For example, the device 110 may determine the first cross-correlation data by determining a cross-correlation between first audio data associated with the first microphone (e.g., $k_0$) and third audio data associated with the third microphone (e.g., $k_2$). In some examples, the device 110 may determine the first cross-correlation data using Equations [9]-[12b], although the disclosure is not limited thereto.

After generating the first cross-correlation data, the device 110 may identify local maxima and determine the first correlation peak values, which indicate locations of each significant peak represented in the first cross-correlation data. For example, the device 110 may determine a total number of significant peaks represented in the first cross-correlation data and identify a respective position (e.g., time lag) associated with each of the peaks. As illustrated in FIG. 10, the first correlation peak values include a single magnitude value from the first cross-correlation data for each of the peak positions (e.g., identified time lags), and may set the remaining values equal to zero. Thus, if the first cross-correlation data includes a total of P significant peaks, the first correlation peak values include a total of P nonzero correlation values.

The device 110 may determine the first quality factor values using the techniques described above with regard to FIGS. 5A-5B. In some examples, the device 110 may perform soft raster matching to determine quality factors $q_n$, n=0 to Pc−1 associated with the cross-correlation peaks, although the disclosure is not limited thereto. As used herein, the first quality factor values may be referred to as first quality factor data or first modified cross-correlation data without departing from the disclosure.

Referring to the correlation chart 1000, the first cross-correlation data includes two peaks inside lag∈[−L=−3, L=3]. Using the first quality factor values, the device 110 may determine that a first peak associated with a first position (e.g., lag=−2) corresponds to direct sound, whereas a second peak associated with a second position (e.g., lag=1) corresponds to an acoustic reflection. For example, a first portion of the first quality factor values that is associated with the first position has large positive correlation values, whereas a second portion of the first quality factor values that is associated with the second position has negative correlation values.

FIG. 11 illustrates an example of cross-correlation data and modified cross-correlation data according to embodiments of the present disclosure. As illustrated in FIG. 11, second cross-correlation data for the second microphone pair 820 (e.g., $k_0$ and $k_1$) is represented as a line, second correlation peak values corresponding to the second cross-correlation data are represented as circles, and second quality factor values are represented as diamonds.

In some examples, the device 110 may use the second cross-correlation data to determine the SRP values and the second quality factor values to determine the modified SRP values, as described above. For example, the modified SRP values may see a boost to the direct sound power and attenuation and/or suppression of the acoustic reflection power relative to the SRP values.

The second cross-correlation data included in the correlation chart 1100 corresponds to the cross-correlation data for the second microphone pair 820 illustrated in FIG. 8 and previously described above. For example, the device 110 may determine the second cross-correlation data by determining a cross-correlation between first audio data associated with the first microphone (e.g., $k_0$) and second audio data associated with the second microphone (e.g., $k_1$). In some examples, the device 110 may determine the second cross-correlation data using Equations [9]-[12b], although the disclosure is not limited thereto.

After generating the second cross-correlation data, the device 110 may identify local maxima and determine the second correlation peak values, which indicate locations of each significant peak represented in the second cross-correlation data. For example, the device 110 may determine a total number of significant peaks represented in the second cross-correlation data and identify a respective position (e.g., time lag) associated with each of the peaks. As illustrated in FIG. 10, the second correlation peak values include a single magnitude value from the second cross-correlation data for each of the peak positions (e.g., identified time lags), and may set the remaining values equal to zero. Thus, if the second cross-correlation data includes a total of P significant peaks, the second correlation peak values include a total of P nonzero correlation values.

The device 110 may determine the second quality factor values using the techniques described above with regard to FIGS. 5A-5B. In some examples, the device 110 may perform soft raster matching to determine quality factors $q_n$, n=0 to Pc−1 associated with the cross-correlation peaks, although the disclosure is not limited thereto. As used herein, the second quality factor values may be referred to as second quality factor data or second modified cross-correlation data without departing from the disclosure.

Referring to the correlation chart 1100, the second cross-correlation data includes a single broad peak inside lag∈[−L, L]. Despite only including a single peak, the second quality factor values appear to be boosting the direct power (e.g., negative lag values) and suppressing the reflective power (e.g., positive lag values).

FIG. 12 illustrates an example of cross-correlation data and modified cross-correlation data according to embodiments of the present disclosure. As illustrated in FIG. 12, third cross-correlation data for the third microphone pair 830 (e.g., $k_0$ and $k_4$) is represented as a line, third correlation peak values corresponding to the third cross-correlation data are represented as circles, and third quality factor values are represented as diamonds.

The device 110 may determine the third cross-correlation data, the third correlation peak values, and the third quality factor values as described above with regard to FIGS. 10-11. Referring to the correlation chart 1200, the third cross-correlation data includes a single narrow peak inside lag$\in$ [−L, L]. As there is only a single narrow peak, the device 110 may ignore the third quality factor values as they do not appear to distinguish between the direct sound and the acoustic reflection.

As described above, the device 110 may include the second quality factor values associated with a single broad peak, but may ignore the third quality factor values associated with a single narrow peak. In some examples, the device 110 may measure a width of the peak when there is only a single peak detected in the cross-correlation data and make a determination by comparing the width to a width threshold, although the disclosure is not limited thereto.

In some examples, the device 110 may determine cross-correlation data and quality factor data and may generate two sets of power values. For example, the device 110 may use the cross-correlation data to generate SRP values, while using the quality factor data (e.g., modified cross-correlation data) to generate modified SRP values. The SRP values represent power associated with a given direction, and the device 110 may perform further analysis in order to derive the direction(s) of one or more sound sources. For example, the device 110 may use the modified SRP values to perform reflection detection to determine whether a certain direction is likely to contain an acoustic reflection.

To illustrate an example, the device 110 may detect two potential sound sources represented in the SRP values. Using the modified SRP values, the device 110 may perform reflection detection to determine which potential sound source corresponds to direct sound waves received from the sound source (e.g., user 5) and which potential sound source corresponds to reflected sound waves (e.g., acoustic reflections 35) reflected by the acoustically reflective surface 22. In some examples, the device 110 may derive a spatial or direction mask based on the modified SRP values, optionally perform time smoothing for the modified SRP values, find the peak value within a frame, and then determine a threshold value by multiplying the peak value with a constant. Using the threshold value, the device 110 may determine a direction associated with the direct sound. For example, the device 110 may determine a single modified SRP value that exceeds the threshold value, although the disclosure is not limited thereto.

Figure 13:
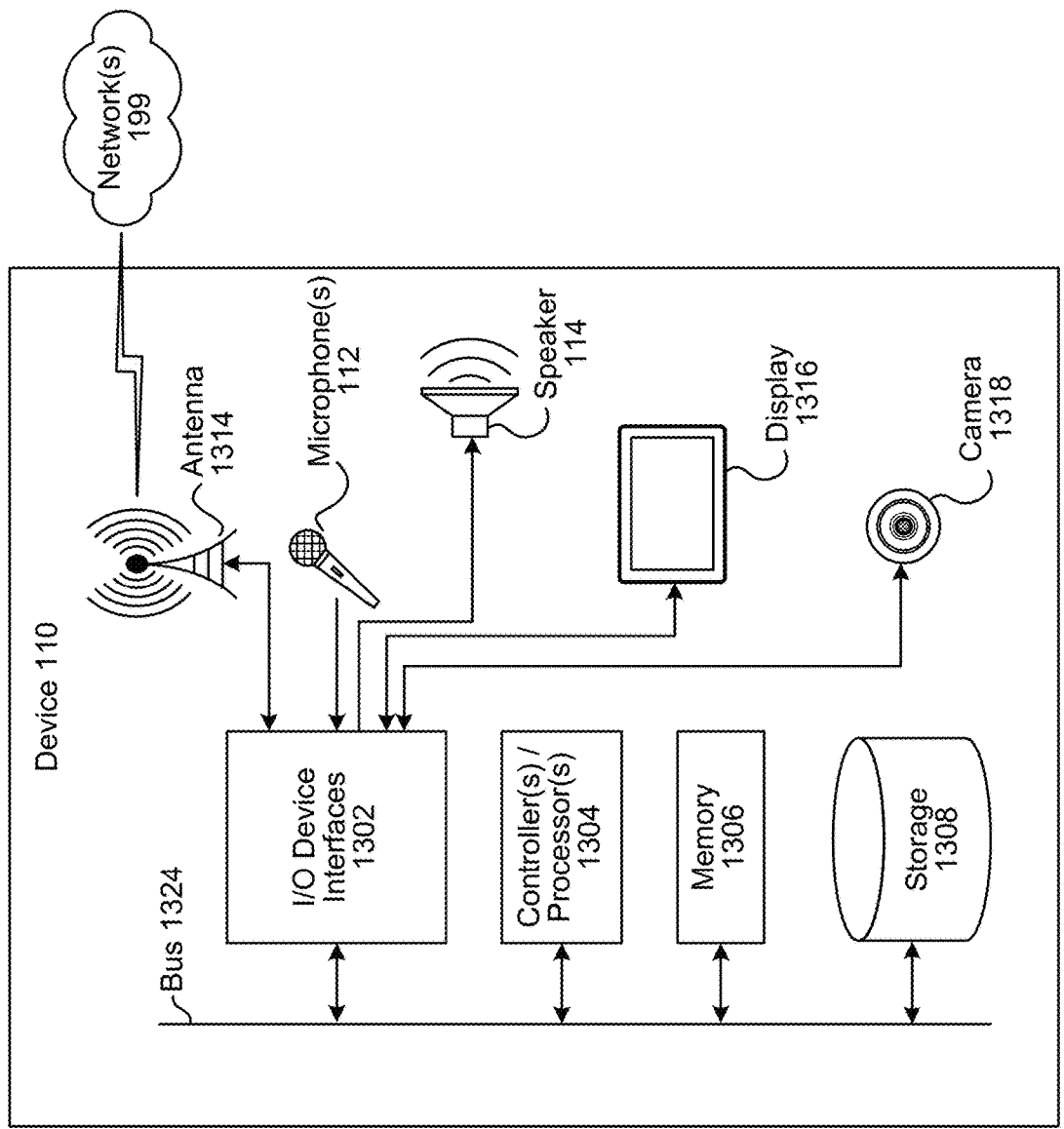
FIG. 13 is a block diagram conceptually illustrating example components of a device according to embodiments of the present disclosure.

FIG. 13 is a block diagram conceptually illustrating example components of the device 110. In operation, the device 110 may include computer-readable and computer-executable instructions that reside on the system, as will be discussed further below. The device 110 may include one or more audio capture device(s), such as microphones 112. The audio capture device(s) may be integrated into a single device or may be separate. The device 110 may also include an audio output device for producing sound, such as loudspeaker(s) 114. The audio output device may be integrated into a single device or may be separate. The device 110 may include an address/data bus 1324 for conveying data among components of the device 110. Each component within the system may also be directly connected to other components in addition to (or instead of) being connected to other components across the bus 1324.

The device 110 may include one or more controllers/processors 1304 that may each include a central processing unit (CPU) for processing data and computer-readable instructions, and a memory 1306 for storing data and instructions. The memory 1306 may include volatile random-access memory (RAM), non-volatile read only memory (ROM), non-volatile magnetoresistive (MRAM) and/or other types of memory. The device 110 may also include a data storage component 1308, for storing data and controller/processor-executable instructions (e.g., instructions to perform operations discussed herein). The data storage component 1308 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 1302.

Computer instructions for operating the device 110 and its various components may be executed by the controller(s)/processor(s) 1304, using the memory 1306 as temporary "working" storage at runtime. The computer instructions may be stored in a non-transitory manner in non-volatile memory 1306, storage 1308, and/or an external device. Alternatively, some or all of the executable instructions may be embedded in hardware or firmware in addition to or instead of software.

The system may include input/output device interfaces 1302. A variety of components may be connected through the input/output device interfaces 1302, such as the loudspeaker(s) 114, the microphone(s) 112, and a media source such as a digital media player (not illustrated). The input/output interfaces 1302 may include A/D converters (not shown) and/or D/A converters (not shown). In some examples, the input/output interfaces 1302 may include a display 1316 and/or a camera 1318, although the disclosure is not limited thereto.

The input/output device interfaces 1302 may also include an interface for an external peripheral device connection such as universal serial bus (USB), FireWire, Thunderbolt or other connection protocol. The input/output device interfaces 1302 may also include a connection to one or more networks 199 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network(s) 199, the system 100 may be distributed across a networked environment.

Multiple devices may be employed in a single device 110. In such a multi-device device, each of the devices may include different components for performing different aspects of the processes discussed above. The multiple devices may include overlapping components. The components listed in any of the figures herein are exemplary, and may be included a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, wearable computing devices (watches, glasses, etc.), other mobile devices, video game consoles, speech processing systems, distributed computing environments, etc. Thus the components, components and/or processes described above may be combined or rearranged without departing from the scope of the present disclosure. The functionality of any component described above may be allocated among multiple components, or combined with a different component. As discussed above, any or all of the components may be embodied in one or more general-purpose microprocessors, or in one or more special-purpose digital signal processors or other dedicated microprocessing hardware. One or more components may also be embodied in software implemented by a processing unit. Further, one or more of the components may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented in different forms of software, firmware, and/or hardware, such as an acoustic front end (AFE), which comprises, among other things, analog and/or digital filters (e.g., filters configured as firmware to a digital signal processor (DSP)). Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
   receiving first audio data corresponding to a first microphone associated with a device, the first audio data including a first representation of an audible sound generated by a first sound source;
   receiving second audio data corresponding to a second microphone associated with the device, the second audio data including a second representation of the audible sound;
   determining first data representing a correlation between the first audio data and a delayed version of the first audio data;
   determining second data representing a correlation between the first audio data and the second audio data;
   determining third data using the first data and the second data, the third data representing a likelihood that the second data corresponds to direct arrival of the audible sound;
   determining, using the second data, a first plurality of power values including a first value corresponding to a first direction relative to the device and a second value corresponding to a second direction relative to the device;
   determining, using the third data, a second plurality of power values including a third value corresponding to the first direction and a fourth value corresponding to the second direction; and
   determining, using the first plurality of power values and the second plurality of power values, that the first sound source is associated with the first direction.

2. The computer-implemented method of claim 1, wherein determining that the first sound source is associated with the first direction further comprises:
   determining that the first value corresponds to a peak value represented in the first plurality of power values;
   determining, using the first direction, the third value from the second plurality of power values, wherein the third value corresponds to the first direction; and
   determining that the third value exceeds a threshold value.

3. The computer-implemented method of claim 1, further comprising:
   determining that the second value corresponds to a peak value represented in the first plurality of power values;
   determining, using the second direction, the fourth value from the second plurality of power values, wherein the fourth value corresponds to the second direction;
   determining that the fourth value is below a threshold value; and
   determining that the second direction corresponds to acoustic reflections of the first sound source.

4. The computer-implemented method of claim 1, wherein determining that the first sound source is associated with the first direction further comprises:
   determining that the first value corresponds to a first peak value represented in the first plurality of power values;

determining that the second value corresponds to a second peak value represented in the first plurality of power values;

determining, using the first direction, the third value from the second plurality of power values, wherein the third value corresponds to the first direction;

determining, using the second direction, the fourth value from the second plurality of power values, wherein the fourth value corresponds to the second direction;

determining that the third value exceeds a threshold value; and determining that the fourth value is below the threshold value.

5. The computer-implemented method of claim 1, wherein determining the third data further comprises:

detecting a first peak value represented in the first data at a first time lag value;

detecting a second peak value represented in the second data at a second time lag value;

determining a third time lag value using the first time lag value and the second time lag value;

determining that a third peak value is represented in the second data at the third time lag value; and determining a fifth value in the third data corresponding to the third time lag value, the fifth value indicating a likelihood that the third time lag value corresponds to the direct arrival of the audible sound.

6. The computer-implemented method of claim 1, wherein determining the third data further comprises:

detecting a first peak value represented in the first data at a first time lag value;

detecting a second peak value represented in the second data at a second time lag value;

determining a third time lag value using the first time lag value and the second time lag value;

determining a plurality of weight values, the plurality of weight values centered around the third time lag value;

detecting a third peak value represented in the second data at a fourth time lag value;

determining a fifth value using the first peak value and a first weight value from the plurality of weight values, wherein the first weight value corresponds to the fourth time lag value; and determining, using the third peak value and the fifth value, a sixth value in the third data corresponding to the fourth time lag value.

7. The computer-implemented method of claim 1, further comprising:

detecting a first plurality of peak values represented in the second data;

determining a highest value from among the first plurality of peak values;

determining, using the highest value, a threshold value; and determining, using the threshold value, a subset of the first plurality of peak values, wherein the third data is determined using the subset.

8. The computer-implemented method of claim 1, wherein a first portion of the third data includes a positive value, the positive value representing a first likelihood that the first portion corresponds to the direct arrival of the audible sound, and a second portion of the third data includes a negative value, the negative value representing a second likelihood that the second portion corresponds to an acoustic reflection of the audible sound.

9. The computer-implemented method of claim 1, further comprising:

determining, using a second portion of the third data, a third plurality of power values including a fifth value corresponding to the first direction and a sixth value corresponding to the second direction;

determining, using the second plurality of power values and the third plurality of power values, a fourth plurality of power values; and determining, using a highest value represented in the fourth plurality of power values, a threshold value that indicates the direct arrival of the audible sound, wherein the first sound source is associated with the first direction based on the threshold value.

10. The computer-implemented method of claim 1, further comprising:

determining, using the first audio data and the second audio data, third audio data corresponding to the first direction;

determining that a wakeword is represented in a portion of the third audio data; and causing language processing to be performed on the portion of the third audio data.

11. A system comprising:

at least one processor; and memory including instructions operable to be executed by the at least one processor to cause the system to:

receive first audio data corresponding to a first microphone associated with a device, the first audio data including a first representation of an audible sound generated by a first sound source;

receive second audio data corresponding to a second microphone associated with the device, the second audio data including a second representation of the audible sound;

determine first data representing a correlation between the first audio data and a delayed version of the first audio data; determine second data representing a correlation between the first audio data and the second audio data;

determine third data using the first data and the second data, the third data representing a likelihood that the second data corresponds to direct arrival of the audible sound;

determine, using the second data, a first plurality of power values including a first value corresponding to a first direction relative to the device and a second value corresponding to a second direction relative to the device;

determine, using the third data, a second plurality of power values including a third value corresponding to the first direction and a fourth value corresponding to the second direction; and determine, using the first plurality of power values and the second plurality of power values, that the first sound source is associated with the first direction.

12. The system of claim 11, wherein the memory further comprises instructions that, when executed by the at least one processor, further cause the system to:

determine that the first value corresponds to a peak value represented in the first plurality of power values;

determine, using the first direction, the third value from the second plurality of power values, wherein the third value corresponds to the first direction; and determine that the third value exceeds a threshold value.

13. The system of claim 11, wherein the memory further comprises instructions that, when executed by the at least one processor, further cause the system to:
- determine that the second value corresponds to a peak value represented in the first plurality of power values;
- determine, using the second direction, the fourth value from the second plurality of power values, wherein the fourth value corresponds to the second direction;
- determine that the fourth value is below a threshold value; and
- determine that the second direction corresponds to acoustic reflections of the first sound source.

14. The system of claim 11, wherein the memory further comprises instructions that, when executed by the at least one processor, further cause the system to:
- determine that the first value corresponds to a first peak value represented in the first plurality of power values;
- determining that the second value corresponds to a second peak value represented in the first plurality of power values;
- determine, using the first direction, in the third value from the second plurality of power values;
- determine, using the second direction, in the fourth value from the second plurality of power values;
- determine that the third value exceeds a threshold value; and
- determine that the fourth value is below the threshold value.

15. The system of claim 11, wherein the memory further comprises instructions that, when executed by the at least one processor, further cause the system to:
- detect a first peak value represented in the first data at a first time lag value;
- detect a second peak value represented in the second data at a second time lag value;
- determine a third time lag value using the first time lag value and the second time lag value;
- determine that a third peak value is represented in the second data at the third time lag value; and
- determine a fifth value in the third data corresponding to the third time lag value, the fifth value indicating a likelihood that the third time lag value corresponds to the direct arrival of the audible sound.

16. The system of claim 11, wherein the memory further comprises instructions that, when executed by the at least one processor, further cause the system to:
- detect a first peak value represented in the first data at a first time lag value;
- detect a second peak value represented in the second data at a second time lag value;
- determine a third time lag value using the first time lag value and the second time lag value;
- determine a plurality of weight values, the plurality of weight values centered around the third time lag value;
- detect a third peak value represented in the second data at a fourth time lag value;
- determine a fifth value using the first peak value and a first weight value from the plurality of weight values, wherein the first weight value corresponds to the fourth time lag value; and
- determine, using the third peak value and the fifth value, a sixth value in the third data corresponding to the fourth time lag value.

17. The system of claim 11, wherein the memory further comprises instructions that, when executed by the at least one processor, further cause the system to:
- detect a first plurality of peak values represented in the second data;
- determine a highest value from among the first plurality of peak values;
- determine, using the highest value, a threshold value; and
- determine, using the threshold value, a subset of the first plurality of peak values, wherein the third data is determined using the subset.

18. The system of claim 11, wherein a first portion of the third data includes a positive value, the positive value representing a first likelihood that the first portion corresponds to the direct arrival of the audible sound, and a second portion of the third data includes a negative value, the negative value representing a second likelihood that the second portion corresponds to an acoustic reflection of the audible sound.

19. The system of claim 11, wherein the memory further comprises instructions that, when executed by the at least one processor, further cause the system to:
- determine, using a second portion of the third data, a third plurality of power values including a fifth value corresponding to the first direction and a sixth value corresponding to the second direction;
- determine, using the second plurality of power values and the third plurality of power values, a fourth plurality of power values; and
- determine, using a highest value represented in the fourth plurality of power values, a threshold value that indicates the direct arrival of the audible sound,
- wherein the first sound source is associated with the first direction based on the threshold value.

20. The system of claim 11, wherein the memory further comprises instructions that, when executed by the at least one processor, further cause the system to:
- determine, using the first audio data and the second audio data, third audio data corresponding to the first direction;
- determine that a wakeword is represented in a portion of the third audio data; and
- cause language processing to be performed on the portion of the third audio data.

* * * * *